United States Patent
Park et al.

(10) Patent No.: US 11,252,272 B2
(45) Date of Patent: *Feb. 15, 2022

(54) ELECTRONIC DEVICE INCLUDING BUTTON AND METHOD FOR OPERATION IN ELECTRONIC DEVICE

(71) Applicant: SAMSUNG ELECTRONICS CO., LTD., Suwon-si (KR)

(72) Inventors: Changbyung Park, Suwon-si (KR); Juwan Park, Suwon-si (KR); Joohoon Lee, Suwon-si (KR); Jongwu Baek, Suwon-si (KR); Hyunsuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/879,504

(22) Filed: May 20, 2020

(65) Prior Publication Data

US 2020/0336584 A1 Oct. 22, 2020

Related U.S. Application Data

(63) Continuation of application No. 16/535,757, filed on Aug. 8, 2019.

(30) Foreign Application Priority Data

Aug. 9, 2018 (KR) .................. 10-2018-0093137

(51) Int. Cl.
*G06F 3/0354* (2013.01)
*G06F 3/046* (2006.01)
(Continued)

(52) U.S. Cl.
CPC .......... *H04M 1/724* (2021.01); *G06F 3/0383* (2013.01); *G06F 3/03545* (2013.01);
(Continued)

(58) Field of Classification Search
CPC ................ H04M 1/72519; G06F 3/046; G06F 3/04162; G06F 3/03545; G06F 3/0383;
(Continued)

(56) References Cited

U.S. PATENT DOCUMENTS 5,525,981 A 6/1996 Abernethy
8,803,851 B2 8/2014 Lin et al.
(Continued)

FOREIGN PATENT DOCUMENTS

JP 2009-020718 1/2009
KR 10-2006-0125375 12/2006
(Continued)

OTHER PUBLICATIONS

International Search Report and Written Opinion dated Nov. 27, 2019 in counterpart International Patent Application No. PCT/KR2019/010127.

(Continued)

*Primary Examiner* — Chad M Dicke
(74) *Attorney, Agent, or Firm* — Nixon & Vanderhye, P.C.

(57) ABSTRACT

Various embodiments relate to an electronic device including a button and a method for an operation in the electronic device. The electronic device may include: an elongated housing comprising a first end and a second end; a dielectric tip disposed at the first end; a button arranged on an outer surface of the housing; a first circuit connected to the dielectric tip and configured to receive a first electromagnetic signal from a touchscreen display of an external device and to transmit a second electromagnetic signal to the (Continued)

display of the external device; a second circuit configured to wirelessly receive and transmit a third signal; and a control circuit operatively connected to the first circuit and the second circuit. The control circuit may be configured to: detect pressing and/or touching of the button while the first electromagnetic signal is received through the first circuit and transmit the second electromagnetic signal while preventing the second circuit from transmitting the third signal; and detect pressing and/or touching of the button without receiving the first signal through the first circuit and transmit the third signal while the second signal is not transmitted.

18 Claims, 15 Drawing Sheets

(51) Int. Cl.
  *G06F 3/041* (2006.01)
  *G06F 3/038* (2013.01)
  *H04M 1/724* (2021.01)
  *H04W 4/80* (2018.01)

(52) U.S. Cl.
  CPC .......... *G06F 3/046* (2013.01); *G06F 3/04162* (2019.05); *G06F 2203/0384* (2013.01); *G06F 2203/04108* (2013.01); *H04W 4/80* (2018.02)

(58) Field of Classification Search
  CPC .. G06F 2203/04108; G06F 2203/0384; H04W 4/80
  See application file for complete search history.

(56) References Cited

U.S. PATENT DOCUMENTS

| | | | |
|---|---|---|---|
| 10,133,385 | B1 | 11/2018 | Maloney et al. |
| 10,979,552 | B2 | 4/2021 | Park et al. |
| 2003/0044069 | A1* | 3/2003 | Ku ........................ G06K 9/222 382/187 |
| 2003/0089783 | A1* | 5/2003 | Zechlin ............... G06F 3/03545 235/472.03 |
| 2004/0008189 | A1* | 1/2004 | Clapper ................ G06F 3/0488 345/179 |
| 2004/0174343 | A1 | 9/2004 | Chao et al. |
| 2006/0256097 | A1* | 11/2006 | Oliver ................. G06F 3/03545 345/179 |
| 2006/0284854 | A1 | 12/2006 | Cheng et al. |
| 2007/0008294 | A1 | 1/2007 | Huang et al. |
| 2007/0188480 | A1 | 8/2007 | Teng et al. |
| 2008/0128180 | A1 | 6/2008 | Perski et al. |
| 2010/0206644 | A1 | 8/2010 | Yeh |
| 2010/0207893 | A1 | 8/2010 | Yeh et al. |
| 2010/0263945 | A1 | 10/2010 | Mao et al. |
| 2011/0297458 | A1 | 12/2011 | Mao et al. |
| 2012/0068975 | A1 | 3/2012 | Wei et al. |
| 2012/0315851 | A1 | 12/2012 | Park |
| 2012/0331546 | A1* | 12/2012 | Falkenburg ............. G06F 21/36 726/16 |
| 2013/0203353 | A1 | 8/2013 | Kim et al. |
| 2014/0022193 | A1 | 1/2014 | Kim et al. |
| 2014/0028634 | A1 | 1/2014 | Krah et al. |
| 2014/0192031 | A1 | 7/2014 | Je et al. |
| 2014/0210744 | A1 | 7/2014 | Song et al. |
| 2014/0253467 | A1* | 9/2014 | Hicks ...................... G06F 3/033 345/173 |
| 2014/0253520 | A1 | 9/2014 | Cueto et al. |
| 2015/0002482 | A1* | 1/2015 | Mercea ............... G06F 3/03545 345/179 |
| 2015/0153845 | A1* | 6/2015 | Chang ................... G06F 3/0383 345/179 |
| 2015/0168466 | A1 | 6/2015 | Park et al. |
| 2015/0234528 | A1 | 8/2015 | Choi et al. |
| 2016/0048224 | A1 | 2/2016 | Brunet et al. |
| 2016/0246389 | A1* | 8/2016 | Munakata ............. G06F 3/0383 |
| 2016/0266663 | A1 | 9/2016 | Holsen |
| 2017/0097696 | A1 | 4/2017 | Park et al. |
| 2017/0322642 | A1* | 11/2017 | Zhang ................... G06F 1/1626 |
| 2018/0217685 | A1 | 8/2018 | Xi et al. |
| 2018/0314364 | A1 | 11/2018 | Yeh |
| 2019/0377430 | A1 | 12/2019 | Lee et al. |
| 2020/0052520 | A1* | 2/2020 | Kang ..................... G06F 1/266 |

FOREIGN PATENT DOCUMENTS

| | | |
|---|---|---|
| KR | 10-2009-0056220 | 6/2009 |
| KR | 10-2014-0096752 | 8/2014 |
| KR | 10-2014-0099599 | 8/2014 |
| KR | 10-2015-0069969 | 6/2015 |
| KR | 10-1778527 | 9/2017 |

OTHER PUBLICATIONS

Park et al., U.S. Appl. No. 16/535,757, filed Aug. 8, 2019.
Notification of the Reasons for Rejection dated Jun. 12, 2020 in counterpart Korean Patent Application No. 10-2018-0093137 and English-language translation.
Office Action dated Jul. 29, 2020 in U.S. Appl. No. 16/535,757 and English-language translation.
Park et al., U.S. Appl. No. 17/227,443, filed Apr. 12, 2021.
Park et al., U.S. Appl. No. 16/535,757, filed Aug. 9, 2019, now U.S. Pat. No. 10,979,552.

* cited by examiner

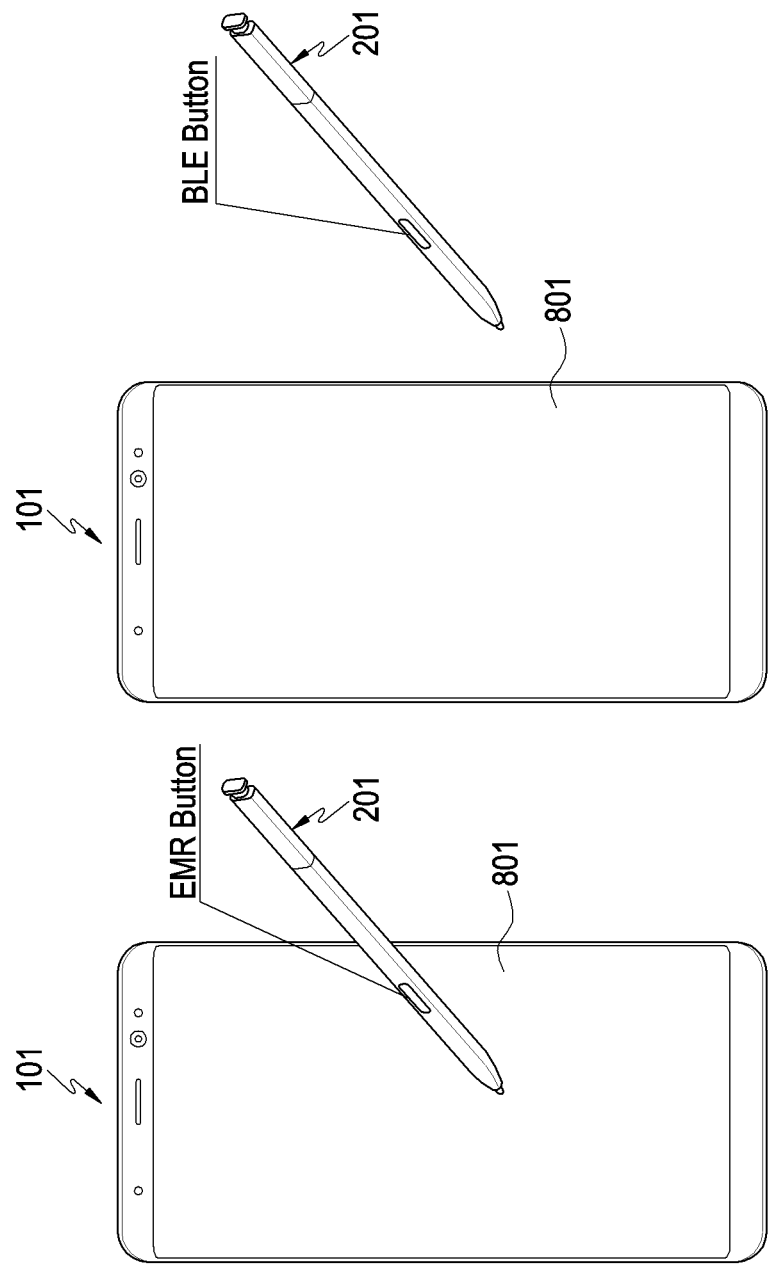

ELECTRONIC DEVICE INCLUDING BUTTON AND METHOD FOR OPERATION IN ELECTRONIC DEVICE

CROSS-REFERENCE TO RELATED APPLICATIONS

This application is a continuation of U.S. application Ser. No. 16/535,757, filed Aug. 8, 2019, which is based on and claims priority under 35 U.S.C. § 119 to Korean Patent Application No. 10-2018-0093137, filed on Aug. 9, 2018, in the Korean Intellectual Property Office. The disclosures of these applications are incorporated by reference herein in their entireties.

TECHNICAL FIELD

The disclosure relates to an electronic device including a button for a user information input and a method for an operation in the electronic device.

BACKGROUND

Recently, electronic devices have evolved into various types for user convenience.

Electronic devices have evolved into various types, such as an input means for an input interface used to manipulate an external electronic device and to input user information by the external electronic device. Such input means include an electronic device having a pen function (for example, a stylus or an electronic pen), and user information may be input to an external electronic device including a touchscreen through the touchscreen of the external electronic device.

Electronic devices having the pen function commonly adopt an electromagnetic resonance (EMR) type among input types, and a Bluetooth function-based input type has recently been developed.

An electronic device having a pen function tends to be configured such that the same can be mounted on an external device in view of the user's convenience and portability of the device, or such that the device size is made smaller, and may have a button as an input interface for a user input.

In order to apply various functions or various input types, however, one single button needs to be used to perform one function, or other buttons corresponding to various input types need to be provided additionally.

However, adding and configuring buttons makes the structure of the electronic device complicated, and if the electronic device is accordingly configured to be mounted on an external device, the external device needs to have a large mounting space and becomes complicated.

In addition, if a Bluetooth function is applied as another input type to the electronic device, the Bluetooth function operates every time the user conducts a button input and quickly reduces the current in the small-capacity battery. This may cause inconvenience in using the electronic device.

SUMMARY

According to various embodiments, an electronic device including a button and a method is provided, wherein an EMR input type or a Bluetooth low energy (hereinafter, referred to as BLE) input type is selectively determined according to whether or not an approach signal is identified, thereby reducing battery current consumption.

According to various example embodiments, an electronic device may include: an elongated housing including a first end and a second end; a dielectric tip disposed at the first end; a button arranged on an outer surface of the housing; a first circuit connected to the dielectric tip and configured to receive a first electromagnetic signal from a touchscreen display of an external device and to transmit a second electromagnetic signal to the display of the external device; a 30 second circuit configured to wirelessly receive and transmit a third signal; and a control circuit operatively connected to the first circuit and the second circuit. The control circuit may be configured to: detect pressing and/or touching of the button while the first electromagnetic signal is received through the first circuit and transmit the second electromagnetic signal while preventing the second circuit from transmitting the third signal; and detect pressing or touching of the button without receiving the first signal through the first circuit and transmit the third signal while the second signal is not transmitted.

According to various example embodiments, an electronic device may include: an elongated housing including a first end and a second end; a dielectric tip disposed at the first end; a button arranged on an outer surface of the housing; a first communication unit comprising first communication circuitry connected to the dielectric tip and configured to receive a first electromagnetic signal from a touchscreen display of an external device and to transmit a second electromagnetic signal to the display of the external device; a second communication unit comprising second communication circuitry configured to wirelessly receive and transmit a third signal; a processor operatively connected to the first communication unit and the second communication unit; and a memory electrically connected to the processor. The memory may include instructions that, when executed, cause the processor to control the electronic device to: transmit the second signal to the external device while preventing a third signal from being transmitted through the second communication unit in response to pressing and/or touching of the button, while the first signal is received through the first communication unit; and transmit the third signal to the external electronic device through the second communication unit in response to pressing and/or touching of the button, while the first signal is not received through the first communication unit.

According to various example embodiments, a method for an operation in an electronic device including a button for a user information input may include: receiving a first electromagnetic signal from a touchscreen display of an external device; detecting pressing and/or touching of the button; transmitting a second electromagnetic signal to the display of the external device, while preventing a third signal from being transmitted through a first communication unit, in response to pressing or touching of the button while the first signal is received; and transmitting the third signal to the external device through a second communication unit in response to pressing and/or touching of the button without receiving the first signal.

An electronic device and a method for an operation in the electronic device according to various example embodiments may have at least the following advantages: the electronic device detects pressing and/or touching of a button, selectively determines an EMR input type or a BLE input type according to whether or not an approach signal is identified, and transmits a signal that follows the determined input type to an external electronic device. Accordingly, there is no need to additionally configure a separate button, and the BLE operation resulting from button pressing is minimized and/or reduced, thereby reducing battery current consumption; and the actual time of use of the Bluetooth module is accordingly reduced.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 8A is a diagram illustrating an example operation between a first electronic device and a second electronic device according to various embodiments;

FIG. 8B is a diagram illustrating an example operation between a first electronic device and a second electronic device according to various embodiments;

DETAILED DESCRIPTION

Figure 1:
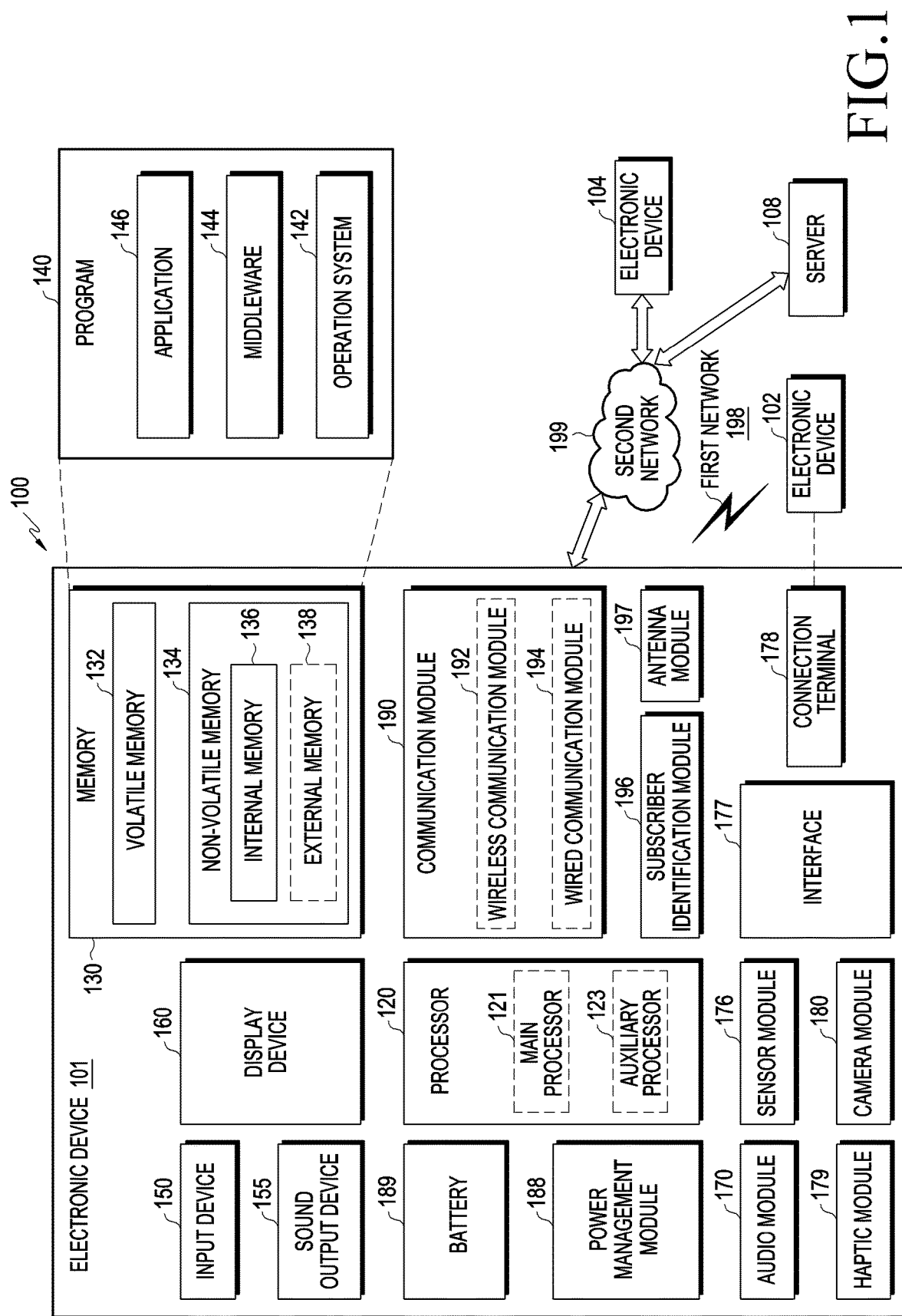
FIG. 1 is a diagram illustrating an electronic device in a network environment according to various embodiments.

The electronic device according to various embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

In various example embodiments described below, an electronic device having a pen function for inputting user information (for example, the electronic device 102 of FIG. 1) may be described as a first electronic device, and the electronic device 101 of FIG. 1 may be described as a second electronic device, which is an external electronic device.

Hereinafter, the first electronic device and the second electronic device according to various embodiments will be described with reference to the accompanying drawings.

Figure 2:
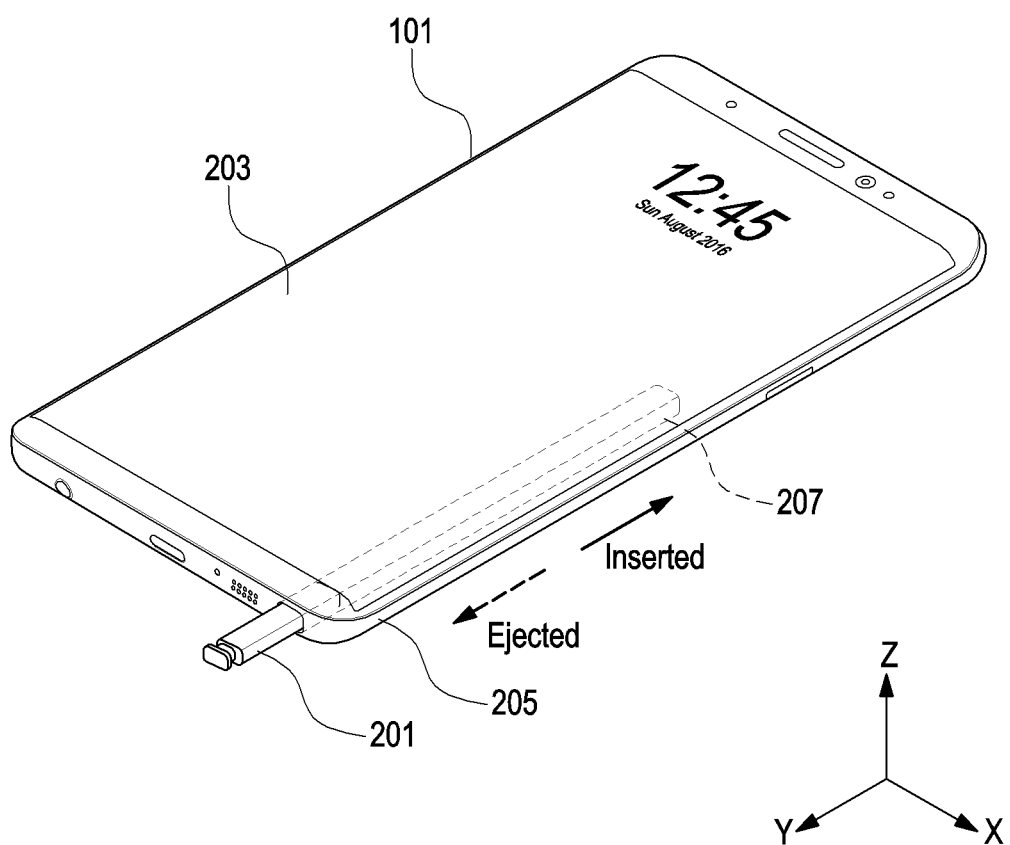
FIG. 2 is a diagram illustrating an example configuration of a first electronic device and a second electronic device according to various embodiments.

FIG. 2 is a diagram illustrating an example configuration of the first electronic device and the second electronic device according to various embodiments.

Referring to FIG. 2, the first electronic device 201 according to various embodiments may be configured such that the first electronic device 201 can be mounted on (or within) the second electronic device 101 and may be configured as an input device for inputting a user interface to a display 203 (for example, the display device 160 of FIG. 1) having a touchscreen of the second electronic device 101.

The second electronic device 101 may include an insertion opening 207 configured such that the first electronic device 201 can be inserted therein from a side surface of the housing 205 of the second electronic device 101. The second electronic device 101 may include an antenna (not illustrated) (for example, the antenna module 197 of FIG. 1) inside the insertion opening 207 such that the first electronic device 201 can communicate outside the same.

The first electronic device 201 may operate differently in a state in which the first electronic device 201 is inserted into the insertion opening 207 and in a state in which the first electronic device 201 is ejected or withdrawn from the insertion opening 207. According to various embodiments, the first electronic device 201 may be configured such that the first electronic device 201 is provided separately without being inserted into the second electronic device 101.

Figure 3:
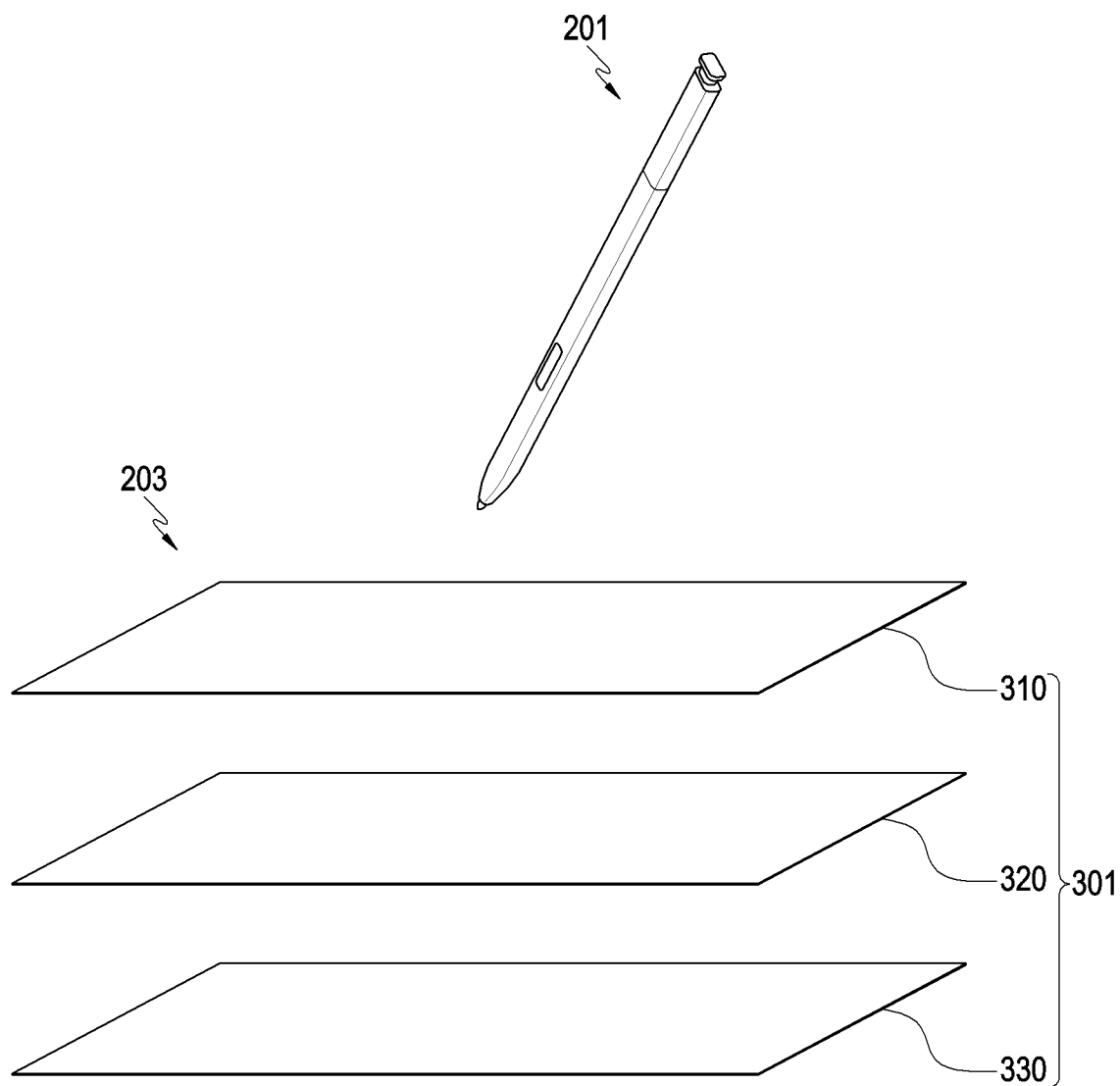
FIG. 3 is a diagram illustrating an example configuration of a second electronic device based on an EMR input type according to various embodiments.

FIG. 3 is a diagram illustrating an example configuration of a second electronic device based on an EMR input type according to embodiments.

Referring to FIG. 3, the touchscreen 301 included in the display (for example, the display 203 of FIG. 2) of the second electronic device 101 may include a display panel 310, a first touch panel 320, and a second touch panel 330. The display panel 310 may be a panel such as, for example, and without limitation, an LCD, an AMOLED, or the like, and may display various images related to various operating states of the second electronic device 101, application execution, services, and the like.

The first touch panel 320 may, for example, be a capacitance-type touch panel obtained by, for example, coating one surface of glass or both surfaces thereof with a thin metal conductive material (for example, indium tin oxide (ITO) film) such that the glass surface is coated with a dielectric material which enables a current to flow and which can store an electric charge. If an input instrument (for example, the user's finger or an electronic pen) touches the surface of the first touch panel 320, a predetermined amount of electric charge is moved to the touched position by static elasticity, and the first touch panel 320 can sense the touched position by recognizing the amount of current change resulting from the movement of the electric charge. Through the first touch panel 320, any kind of touch capable of generating static elasticity can be sensed, including all touches by the input instrument (finger or electronic pen).

The second touch panel 330 may, for example, be an EMR-type touch panel, and may include an electromagnetic induction coil sensor (not illustrated) having multiple loop coils arranged in a first direction and in a second direction that intersects with the first direction, respectively, thereby having a grid structure, and an electronic signal processing unit (not illustrated) configured to successively provide AC signals having a predetermined frequency to respective coils of the electromagnetic induction coil sensor. If the first electronic device 201 including a resonance circuit is near a loop coil of the second touch panel 330, the magnetic field (electromagnetic field) transmitted from the corresponding loop coil may generate a current based on mutual electromagnetic induction in the resonance circuit inside the first electronic device 201. If an induced magnetic field is generated, on the basis of the current, by the coil of the resonance circuit inside the first electronic device 201, the second touch panel 330 may detect the induced magnetic field from the loop coil in a signal-receiving state, thereby sensing the hovering position of the first electronic device 201, the touch position, and/or the height from the second electronic device 101 to the first electronic device 201.

According to an embodiment, the second electronic device 101 may enable the first touch panel 320 to sense a touch by the user's finger and/or an electronic pen and may enable the second touch panel 330 to sense hovering by the first electronic device 201 and/or a touch thereby. Accordingly, the processor (for example, the processor 120 of FIG. 1) of the second electronic device 101 may differently sense a touch by the user's finger or the electronic pen and hovering or a touch by the first electronic device 201.

According to an embodiment, the display panel 310 may be arranged between the first touch panel 320 and the second touch panel 330. The first touch panel 320 may be provided such that the same is stacked on the inner surface of the front glass of the second electronic device 101. However, the disclosure is not limited to any particular arrangement of the panels.

Figure 4:
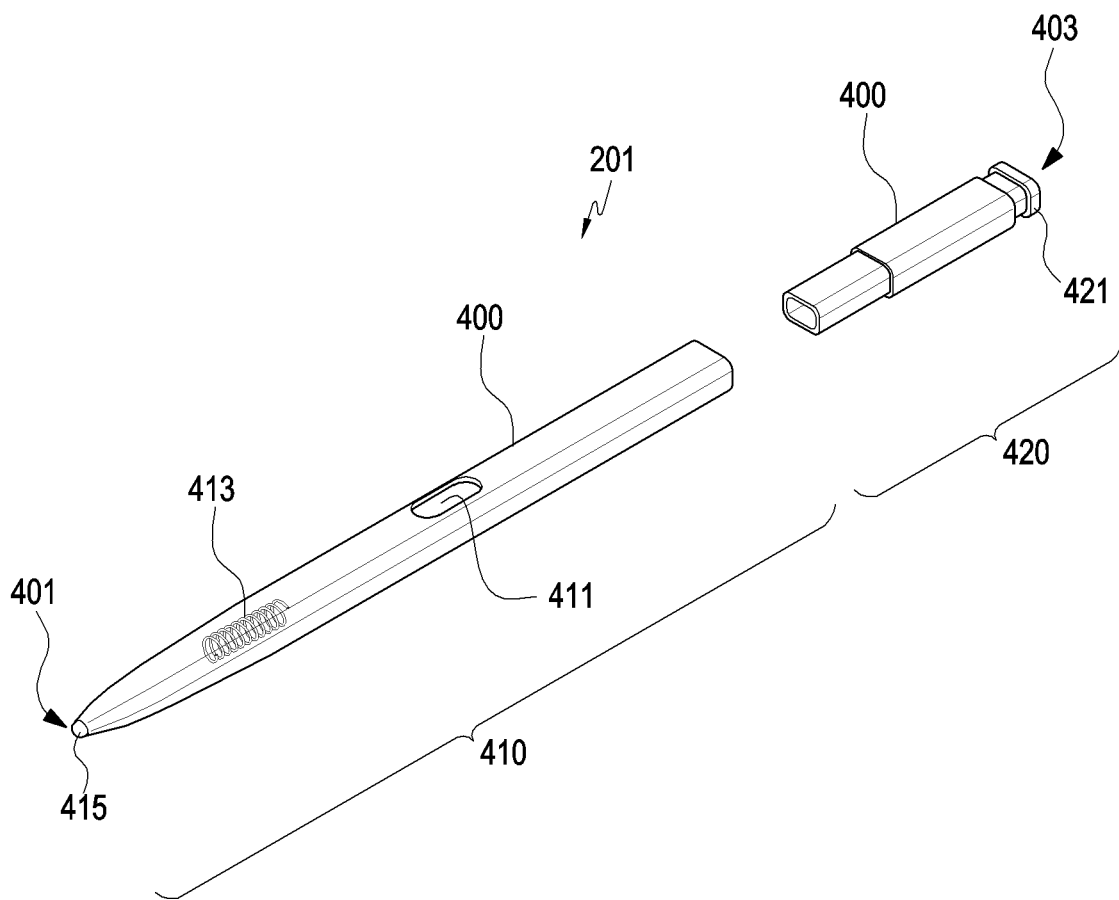
FIG. 4 is a diagram illustrating an example configuration of a first electronic device according to various embodiments.

FIG. 4 is a diagram illustrating an example configuration of a first electronic device according to various embodiments.

Referring to FIG. 4, the first electronic device 201 according to various embodiments may include an elongated housing 400 including a first end 401 and a second end 403. The housing 400 may be divided into a first part 410 and a second part 420 and may be configured such that the first part 410 and the second part 420 can be attached to/detached from each other. The first electronic device 201 may include a button 411 arranged on the outer surface of the first part 410, an EMR coil unit 413 including a dielectric tip 415 inside the first end 401, and at least one module (not illustrated) for operations inside the housing 400. The at least one module may be configured, for example, as a printed circuit board (PCB), and the PCB may be electrically connected to the EMR coil unit 413. The first electronic device 201 may further include a push button 421 on or at the second end 403 of the second part 420 such that the push button 421 may be used when the first electronic device 201 is inserted into the insertion opening 207 (of FIG. 2) or ejected therefrom. If the push button 421 reaches a pressed state, the first electronic device 201 may be ejected from the insertion opening 207, and may switch to an ejected state.

The first electronic device 201 may selectively determine the type of input through the button 411 between an EMR input type and a Bluetooth low energy (hereinafter, referred to as BLE) input type and may transmit a signal that follows an input (e.g., a user input) to the second electronic device 101.

Figure 5:
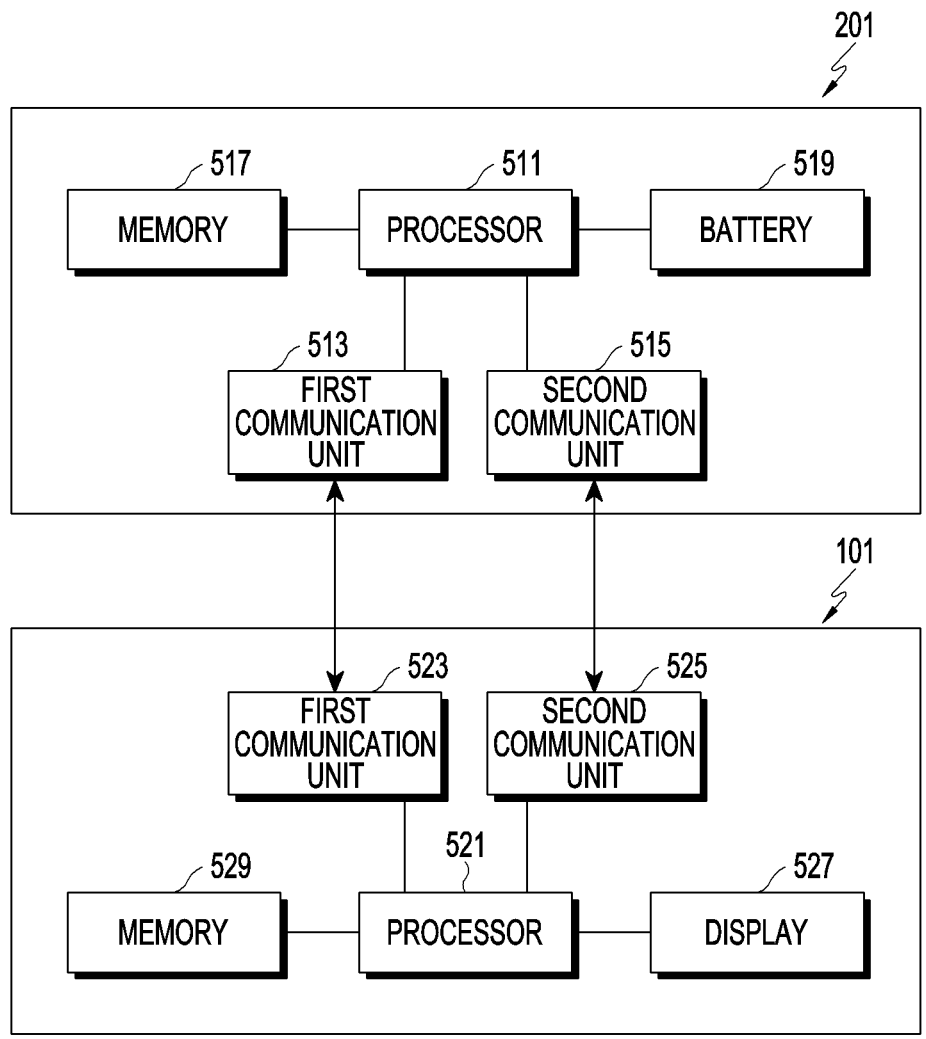
FIG. 5 is a block diagram illustrating an example configuration of a first electronic device and a second electronic device according to various embodiments.

FIG. 5 is a block diagram illustrating an example configuration of a first electronic device and a second electronic device according to various embodiments.

Referring to FIG. 5, the first electronic device 201 according to various embodiments may include a processor (e.g., including processing circuitry) 511, a first communication unit (e.g., including communication circuitry) 513, a second communication unit (e.g., including communication circuitry) 515, a memory 517, and a battery 519. The first electronic device 201 may further include a button (not illustrated) (for example, the button 411 of FIG. 4) arranged on the outer surface of the housing. According to various embodiments, the processor 511 of the first electronic device 201, at least a part of the first communication unit 513, and at least a part of the second communication unit 515 may, for example, be configured as PCBs or chips, and may be electrically connected to the memory 517, the battery 519, and the button.

The processor 511 may include various processing circuitry and receive an approach signal (for example, a first signal) corresponding to an electromagnetic field signal generated by the touchscreen (for example, the touchscreen 301 of FIG. 3) of the second electronic device 101 through the first communication unit 513. The approach signal may refer, for example, to a signal used to determine whether the first electronic device 201 is positioned in-range on the touchscreen 301 of the second electronic device 101.

According to various embodiments, if the approach signal is confirmed while the button of the first electronic device 201 is in a pressed or touched state, the processor 511 may confirm that the button input corresponds to a first communication input type (for example, EMR button input), and may control the first communication unit 513 so as to transmit a second signal (for example, an EMR input signal) to the second electronic device 101.

According to various embodiments, if the approach signal is not confirmed while the button is in a pressed or touched state, the processor 511 may confirm that the button input corresponds to a second communication input type (for example, a BLE button input), and may control the second communication unit 515 so as to transmit a third signal (for example, a BLE input signal) to the second electronic device 101. The processor 511 may selectively determine the second communication input type (for example, a BLE button input) based on receiving the approach signal even if the user uses only one button, and the processor 511 may accordingly control transmission of the third signal while the second signal is not transmitted.

According to various embodiments, the processor 511 may include an operation circuit for determining whether the first electronic device 201 is positioned in-range on the touchscreen 301 of the second electronic device 101.

The processor 511 may, for example, be a hardware module and/or a software module (for example, an application program), and may, for example, be a hardware-based element (function) and/or a software-based element (program) including at least one of various sensors provided in the first electronic device 201, such as, for example, and without limitation, a data measurement module, an input/output interface, a module for managing the state or environment of the first electronic device 201, a communication module, or the like. According to various embodiments, the processor 511 may include, for example, and without limitation, one or more of hardware, software, firmware, and/or a combination of at least two thereof. In addition, according to various embodiments, at least some of the above elements of the processor 511 may be omitted, or the same may further include another element for performing image processing operations besides the above constituent elements.

According to various embodiments, the first communication unit 513 may include various communication circuitry and transmit/receive a signal for a user interface to/from the second electronic device 101 using the EMR input type, for example, and may include an EMR coil unit (for example, identical or similar to the EMR coil unit 413 of FIG. 4) capable of generating an electromagnetic field. The first communication unit 513 may include at least one element (for example, a resistor, a capacitance C, and/or an inductance) that makes it possible to change the intensity or frequency of the electromagnetic field according to the manipulation state. The first communication unit 513 may include a button switch SW1 (not illustrated) that is turned on in response to the user's pressing and/or touching of the button (for example, the button 411 of FIG. 4) arranged on the surface of the housing of the first electronic device 201.

The first communication unit 513 may receive an approach signal corresponding to an electromagnetic field signal (or an electromagnetic signal) generated by the second electronic device 101 as a result of proximate positioning of the first electronic device 201 on the touchscreen 301 of the second electronic device 101. Upon sensing pressing and/or touching of the button by the user, the first communication unit 513 may transfer a button input signal to the processor 511. Upon sensing pressing and/or touching of the button by the user, the first communication unit 513 may change the frequency of the electromagnetic field signal generated by the EMR coil unit (for example, the EMR coil unit 413 of FIG. 4). The first communication unit 513 may transmit a second signal corresponding to the electromagnetic field signal, the frequency of which has been changed, to the second electronic device 101 under the control of the processor 511. The electromagnetic field signal, the frequency of which has been changed, may be transmitted when a button input has been received, and when an approach signal has been received. In the following description, an electromagnetic field signal having a first frequency generated when the button is turned off will be referred to as a first electromagnetic field signal, and an electromagnetic field signal having a second frequency generated when the button is turned on will be referred to as a second electromagnetic field signal.

According to various embodiments, the second communication unit 515 may include various communication circuitry in a module for a near-field communication, that is, a second communication type (for example, a BLE input type), and may transmit a third signal (for example, a BLE signal) to the second electronic device 101 in the second communication type under the control of the processor 511. If it is confirmed by the processor 511 that no approach signal is received, and that a button input signal is received, the second communication unit 515 may recognize that the button input is a BLE button input, and may transmit the third signal to the second electronic device 101. When a button input signal and a approach signal are received, a second signal is transmitted through the first communication unit 513. Accordingly, the second communication unit 515 may not transmit the third signal while the second signal is transmitted under the control of the processor 511.

According to various embodiments, the memory 517 may store information related to overall operations of the first electronic device 201.

According to various embodiments, the battery 519 may store power necessary for overall operations of the first electronic device 201 and may be rechargeable or non-rechargeable. The battery 519 may include, for example, and without limitation, an electric double layered capacitor (EDLC).

Referring to FIG. 5, the second electronic device 101 according to various embodiments may include a processor (e.g., including processing circuitry) 521, a first communication unit (e.g., including communication circuitry) 523, a second communication unit (e.g., including communication circuitry) 525, a display 527 (for example, the display 203 of FIG. 2), and a memory 529.

According to various embodiments, the processor 521 (for example, the processor 120 of FIG. 1) may include various processing circuitry and activate communication with the first electronic device 201 and control an operation for a user interface. If the processor 521 receives an electromagnetic field signal from the first electronic device 201, an induction current may occur in an electromagnetic field circuit (not illustrated) arranged on the touchscreen 301 of the display 527, thereby generating an electromagnetic field signal; and, if an electromagnetic field signal having a specific frequency is received, the processor 521 may identify the position of the first electronic device 201.

According to various embodiments, if the processor 521 receives the second signal from the first electronic device 201 through the first communication unit 523, the processor 521 may determine that the first electronic device 521 is positioned in-range (for example, within 15 mm) on the touchscreen 301 of the display 527. If the second signal is received, the processor 521 may determine that the button input through the first electronic device 201 is an EMR button input and may perform a control operation corresponding to the received second signal in the EMR input type.

According to various embodiments, if the processor 521 receives the third signal from the first electronic device 201 through the second communication unit 525, the processor 521 may determine that the first electronic device 201 is positioned out-of-range on the touchscreen 301 of the display 527. If the third signal is received, the processor 521 may determine that the button input through the first electronic device 201 is a BLE button input and may perform a control operation corresponding to the received third signal in the BLE input type.

According to various embodiments, if the third signal is received together with the second signal, the processor 521 may give priority to the second signal and perform a control operation corresponding to the second signal.

According to various embodiments, the processor 521 may, for example, and without limitation, be one or more of a hardware module, a software module (for example, an application program), may be a hardware-based element (function), may be a software-based element (program) including at least one of various sensors provided in the first electronic device 201, a data measurement module, an input/output interface, a module for managing the state or environment of the first electronic device 201, a communication module, or the like.

In addition, according to various embodiments, the processor 521 of the second electronic device 101 may include, for example, and without limitation, one or more of hardware, software, firmware, a combination of at least two thereof, or the like. According to various embodiments, at least some of the above elements of the processor 521 may be omitted, or the elements may further include another element for performing image processing operations besides the above elements.

According to various embodiments, the first communication unit 523 and the second communication unit 525 (for example, the communication module 190 of FIG. 1) of the second electronic device 101 may include various communication circuitry and communicate with the first electronic device 201, another electronic device, and/or an external device (for example, the electronic device 102 or 104 or the server 108 of FIG. 1) under the control of the processor 521.

According to various embodiments, the first communication unit 523 and the second communication unit 525 may transmit and/or receive data related to operations executed under the control of the processor 521 to/from the first electronic device 201.

According to various embodiments, the first communication unit 523 may conduct EMR-type communication with the first electronic device 201, and the second communication unit 525 may communicate with the first electronic device 201 that is capable of near-field wireless communication (for example, BLE communication).

According to various embodiments, the display 527 (for example, a partial element of the input device 150 of FIG. 1 or the display device 160) of the second electronic device 101 may output operation execution result information (for example, at least one of a text, an image, or a moving image) under the control of the processor 521.

According to various embodiments, the display 527 may display an input pad (for example, a button) in various methods such that at least one of various characters, numbers, or symbols can be input in an input window on the screen. In addition, the display 527 may display a service execution screen in connection with execution of various applications related to information transmission/reception. According to various embodiments, the display 527 may display information in connection with a control operation corresponding to a second signal or a third signal received from the first electronic device 201. In addition, according to an embodiment, if the display 527 of the second electronic device 101 is implemented in a touchscreen type, the display 527 may correspond to the touchscreen of the input unit (not illustrated). When implemented in a touchscreen type together with the input unit, the display 527 may display various kinds of information generated according to the user's touch operation.

In addition, according to an embodiment, the display 527 of the second electronic device 101 may, for example, and without limitation, be at least one of a liquid crystal display (LCD), a thin film transistor LCD (TFT-LCD), an organic light emitting diode (OLED), a light-emitting diode (LED), an active matrix organic LED (AMOLED), a flexible display, a three-dimension display, or the like. In addition, some of these displays may be configured in a transparent type or in a light-transmitting type such that the outside is visible through the display. The display may be implemented as a transparent display including a transparent OLED (TOLED). However, the disclosure is not limited to the foregoing examples.

According to an embodiment, the second electronic device 101 may further include another mounted display unit (for example, an extended display unit or a flexible display unit) besides the display 527 and a display unit of another external electronic device (for example, at least one of an external display device, a wearable device, or an external terminal device) interworking with the second electronic device 101.

According to an embodiment, the memory 529 (for example, the memory 130 of FIG. 1) may store not only programs necessary for function operations according to various embodiments (for example, the program 140 of FIG. 1), but also various kinds of data generated while the program 140 is executed. The memory 529 may largely include a program area 140 and a data area (not illustrated). The program area 140 may store information related to programs for driving the second electronic device 101, such as an OS (for example, the OS 142 of FIG. 1) for booting the second electronic device 101. The data area (not illustrated)

may store transmitted data and/or received data and generated data according to various embodiments. In addition, the memory 529 may include a storage medium corresponding, for example, and without limitation, to at least one of a flash memory, a hard disk, a multimedia card micro-type memory (for example, a secure digital (SD) or extreme digital (XD) memory), a RAM, a ROM, or the like.

According to an embodiment, the memory 529 may store information for communicating with the first electronic device 201 and data related to a control operation corresponding to a received second or third signal.

According to an embodiment, the second electronic device 101 may further include an audio module (not illustrated) (for example, the audio module 170 of FIG. 1). The audio module 170 may output sounds, and may include, for example, and without limitation, at least one of an audio codec, a microphone MIC, a receiver, an earphone output EAR_L, a speaker, or the like.

According to an embodiment, the second electronic device 101 may further include a an instrumentality for outputting vibration (for example, the haptic module 179 of FIG. 1) and/or an instrumentality for outputting smell (not illustrated).

According to various embodiments, elements of the first electronic device 201 and the second electronic device 101 have been described above with reference to FIG. 5. However, according to various embodiments, not all elements described with reference to FIG. 5 are necessary elements, and the first electronic device 201 and the second electronic device 101 may be implemented by more elements than illustrated, or the first electronic device 201 and the second electronic device 101 may be implemented by less elements than illustrated. In addition, the position of elements of the first electronic device 201 and the second electronic device 101 described above with reference to FIG. 5 may be varied according to various embodiments.

Figure 6:
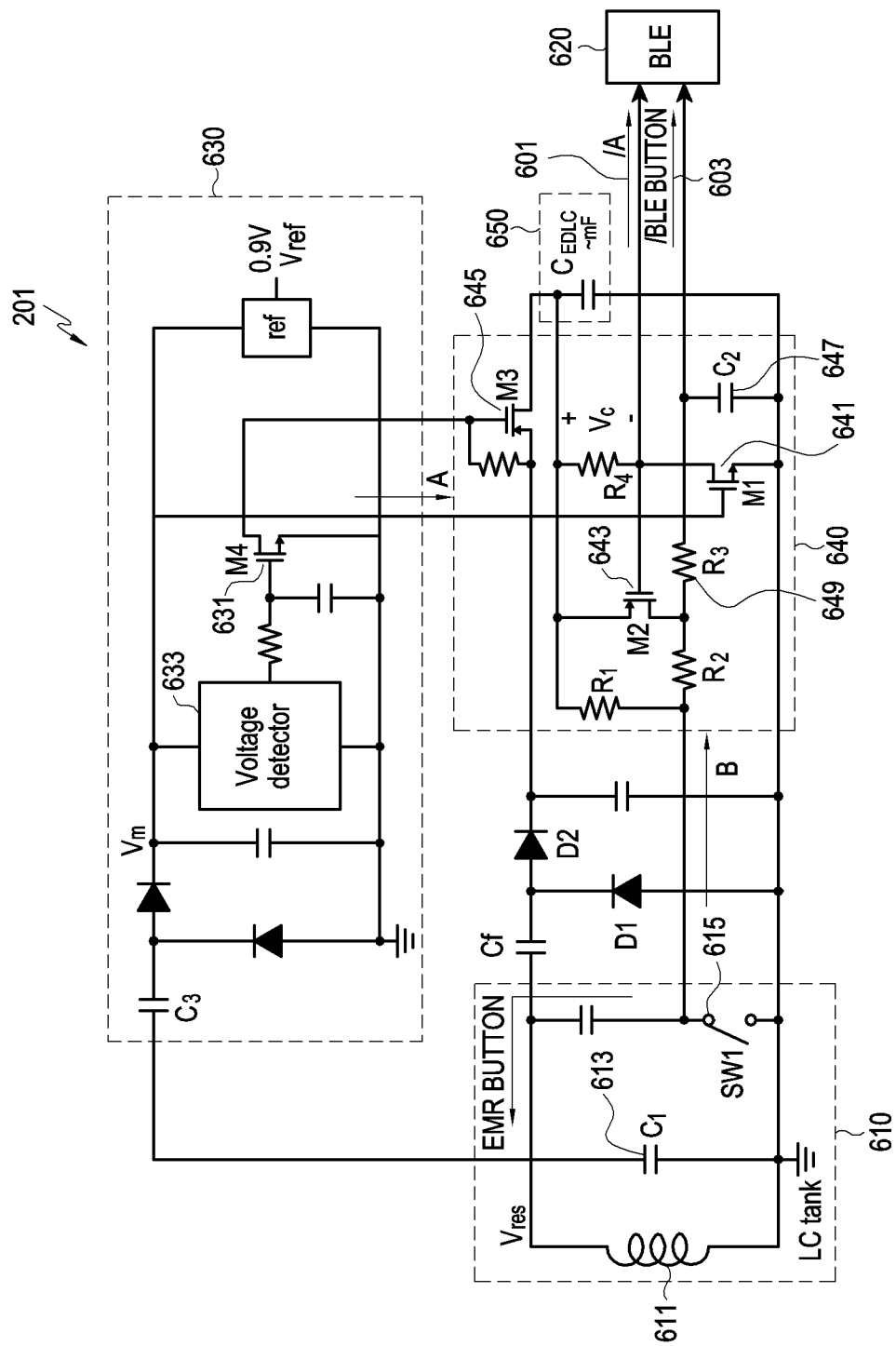
FIG. 6 is a diagram illustrating an example circuit configuration of a first electronic device according to various embodiments.

FIG. 6 is a diagram illustrating an example circuit configuration of a first electronic device according to various embodiments.

Referring to FIG. 6, the first electronic device 201 according to various embodiments may include a first circuit 610, a second circuit 620, a third circuit 630, a control circuit 640, and a battery 650. According to various embodiments, the first electronic device 201 may include the third circuit 630 in the first circuit 610. According to various embodiments, the first electronic device 201 may include an instrumentality capable of providing vibration or friction (not illustrated), such as an actuator.

The first circuit 610 may, for example, be an EMR input-type circuit, for example, and may include a resonance circuit (for example, the EMR coil unit 413 of FIG. 2) including a first inductive element (for example, a coil) 611 capable of generating an electromagnetic field and a first capacitive element (for example, a capacitance C1) 613. In addition, the first circuit 610 may include at least one element (for example, a resistor R, a capacitance C, and/or an inductance L) that makes it possible to change the intensity or frequency of the electromagnetic field according to the manipulation state. The first circuit 610 may include a button switch SW1 615 that is turned in response to the pressing and/or touching of the button (for example, the button 411 of FIG. 4) arranged on the surface of the housing of the first electronic device 201. According to various embodiments, the coil 611 may have a resonance frequency in about 500 KHz band, for example. The first circuit 610 may form at least two resonance frequencies (for example, 530 KHz and 560 KHz bands), and may change the resonance frequency by a variable capacitance. For example, the first resonance frequency (for example, 560 KHz band) may correspond to a drawing operation, and the second resonance frequency (for example, 530 KHz) may correspond to a button operation. At least one capacitance Cf and rectifiers D1 and D2 may be additionally arranged between the first circuit 610 and the control circuit 640 and connected to the battery 650 and the third switch M3 645. The first rectifier D1 among the rectifiers may become conductive if an AC-type resonance voltage Vres generated by the resonance circuit included in the first circuit 610 is smaller than zero (Vres<0). Accordingly, the capacitance Cf may be filled with a voltage corresponding to the negative peak of the voltage Vres. If the voltage Vres increases, the first rectifier D1 may be turned off, and the second rectifier D2 may reach a conductive condition. If the second rectifier D2 reaches the conductive condition, the electric charge in the capacitor Cf may move to the battery 650 through the control circuit 640, thereby changing the battery 650.

If the button switch 615 is switched on in response to the user's pressing and/or touching of the button 411, the first circuit 610 may be connected to the control circuit 640 so as to transfer a button input signal to the control circuit 640, and may change the frequency (or resonance frequency) of an electromagnetic field signal generated by the induction current in the coil 611. The button input signal may indicate a current resulting from pressing or touching of the button.

If an approach signal A is received, and if a button input signal B is generated, the first circuit 610 may transmit, to the second electronic device 101, a second signal corresponding to a second electromagnetic field signal having a changed second frequency.

The second circuit 620 may include a module including various communication circuitry for near-field communication, that is, a second communication type (for example, a BLE input type) and may be connected to the control circuit 640. The second circuit 620 may receive control signals (for example, a first control signal 601 (for example, /A) corresponding to an approach signal (A) and a second control signal 603 (for example, BLE BUTTON) corresponding to a button input signal (B)) output from the control circuit 640 and may transmit a third signal (for example, a BLE signal) to the second electronic signal 101 in the second communication type on the basis of the received control signals 601 and 603. According to various embodiments, the second circuit 620 may check an EMR button value and a BLE button value on the basis of the first control signal (for example, /A) 601 and the second control signal (for example, BLE BUTTON) 603 output from the control signal 640 and, if the checked BLE button value indicates 1, may transmit the third signal to the second electronic device 101.

According to various embodiments, the second circuit 620 may receive operation result values (for example, /A value and BLE BUTTON value) from the control circuit 640 and may transmit the third signal to the second electronic device 101 based on the operation result values. The operation result values may include the EMR button value and the BLE button value that have been checked on the basis of the approach signal A (for example, the first signal) and the button input signal B.

The third circuit 630 may include at least one resistor, a capacitance, and/or a rectifier, and may include a fourth switch M4 631 and a voltage detection circuit 633. The fourth switch M4 may be connected to the third switch M3 645 of the control circuit 640. The voltage detection circuit 633 may monitor the voltage Vm.

The third circuit 630 may be arranged between the first circuit 610 and the battery 650 and may be connected to the resonance circuit of the first circuit 610, the first switch M1 641 of the control circuit 640, and the third switch M3 645 connected to the battery 650. The third circuit 630 may receive an approach signal (for example, a first signal) corresponding to an electromagnetic field signal generated by the touchscreen 301 of the second electronic device 101, and may transfer the received approach signal to the first switch M1 641 of the control circuit 640.

The control circuit 640 may be electrically connected to the first circuit 610, the third circuit 630, the second circuit 620, and the battery 650. The control circuit 640 may include a first switch M1 641, a second switch M2 643, and a third switch M3 645, and may include at least one capacitance C2 647 and resistors R (R1, R2, R3 649, and R4). The capacitance C2 647 may be arranged between the resistor R3 649 and the second circuit 620, and may be electrically connected to the resistor R3 649, the second circuit 620, and the ground. The capacitance C2 647 and the resistor R3 649 may be elements performing operations of low-pass filters so as to prevent erroneous operations of the second circuit 620 due to the operating voltage of the first electronic device 201, which is transferred from Vres when the first switch SW1 615 is turned off. According to various embodiments, the control circuit 640 may include an operation circuit for determining whether or not the first electronic device 201 is positioned in-range on the touchscreen 301 of the second electronic device 101.

The control circuit 640 may receive the button input signal B from the first circuit 610 and receive the approach signal A from the third signal 630. According to various embodiments, if the approach signal A is transferred, and if the button input signal B is transferred, the control circuit 640 may not transfer the button input signal B to the second circuit 620, and may control the first circuit 610 so as to transmit the second signal. According to various embodiments, if the approach signal A is not transferred, and if the button input signal B is transferred, the control circuit 640 may transfer the button input signal B to the second circuit 620 such that the second circuit 620 transmits the third signal. In response to transfer of the button input signal, the second circuit 620 may recognize a low signal voltage (low signal or active-low) and may process information.

The battery 650 may be connected to the third switch M3 645 of the control circuit 640 and the ground, may store power necessary for overall operations, and may be rechargeable or non-rechargeable.

An electronic device according to various example embodiments may include: an elongated housing including a first end and a second end; a dielectric tip disposed at the first end; a button arranged on an outer surface of the housing; a first circuit connected to the dielectric tip and configured to receive a first electromagnetic signal from a touchscreen display of an external device and to transmit a second electromagnetic signal to the display of the external device; a second circuit configured to wirelessly receive and transmit a third signal; and a control circuit operatively connected to the first circuit and the second circuit. The control circuit 640 may be configured to: detect pressing and/or touching of the button while the first signal is received through the first circuit and transmit the second signal while preventing the second circuit from transmitting the third signal; and detect pressing or touching of the button without receiving the first signal through the first circuit and transmit the third signal while the second signal is not transmitted.

According to various embodiments, the third signal may have a frequency between 900 MHz and 5 GHz.

According to various embodiments, the control circuit may be configured to provide a current resulting from pressing and/or touching of the button, and the second circuit may be configured not to transmit the third signal.

According to various embodiments, the control circuit may be configured to not provide a current resulting from pressing and/or touching of the button.

According to various embodiments, the first circuit may include a first inductive element comprising an inductor and a first capacitive element comprising a capacitor electrically coupled in parallel with each other.

According to various embodiments, the control circuit may be configured to provide the second circuit with a first control signal indicating reception of the first signal and a second control signal indicating pressing and/or touching of the button, and the control circuit may include at least one low-pass filter configured to avoid an erroneous operation of the second circuit while pressing and/or touching of the button does not occur.

An electronic device according to various example embodiments may include: an elongated housing including a first end and a second end; a dielectric tip disposed at the first end; a button arranged on an outer surface of the housing; a first communication unit comprising first communication circuitry connected to the dielectric tip and configured to receive a first electromagnetic signal from a display of an external device and to transmit a second electromagnetic signal to the display of the external device; a second communication unit comprising second communication circuitry configured to wirelessly receive and transmit a third signal; a processor operatively connected to the first communication unit and the second communication unit; and a memory electrically connected to the processor. The memory may include instructions that, when executed, cause the processor to control the electronic device to: transmit the second signal to the external device while preventing a third signal from being transmitted through the second communication unit in response to pressing and/or touching of the button, while the first signal is received through the first communication unit; and transmit the third signal to the external electronic device through the second communication unit in response to pressing and/or touching of the button, while the first signal is not received through the first communication unit.

According to various embodiments, the instructions may, when executed, cause the processor to control the electronic device to transmit the second signal while preventing the second communication unit from transmitting the third signal, while the first signal is received through the first communication unit.

According to various embodiments, the instructions may, when executed, cause the processor to control the electronic device to: transmit the third signal through the second communication unit while the second signal is not transmitted.

According to various embodiments, the second signal may be a second electromagnetic signal having a changed frequency, and may be a signal related to a first operation of an application executed by the external device. The third signal may be a Bluetooth low energy (BLE) signal, and may be a signal related to a second operation of the application executed by the external device.

According to various embodiments, the instructions may, when executed, cause the processor to control the electronic device to determine an input type of the button based on a first control signal indicating reception of the first signal and a second control signal indicating pressing and/or touching of the button.

A method for an operation in the above-described first electronic device 201 will be described in greater detail with reference to the accompanying drawings.

Figure 7:
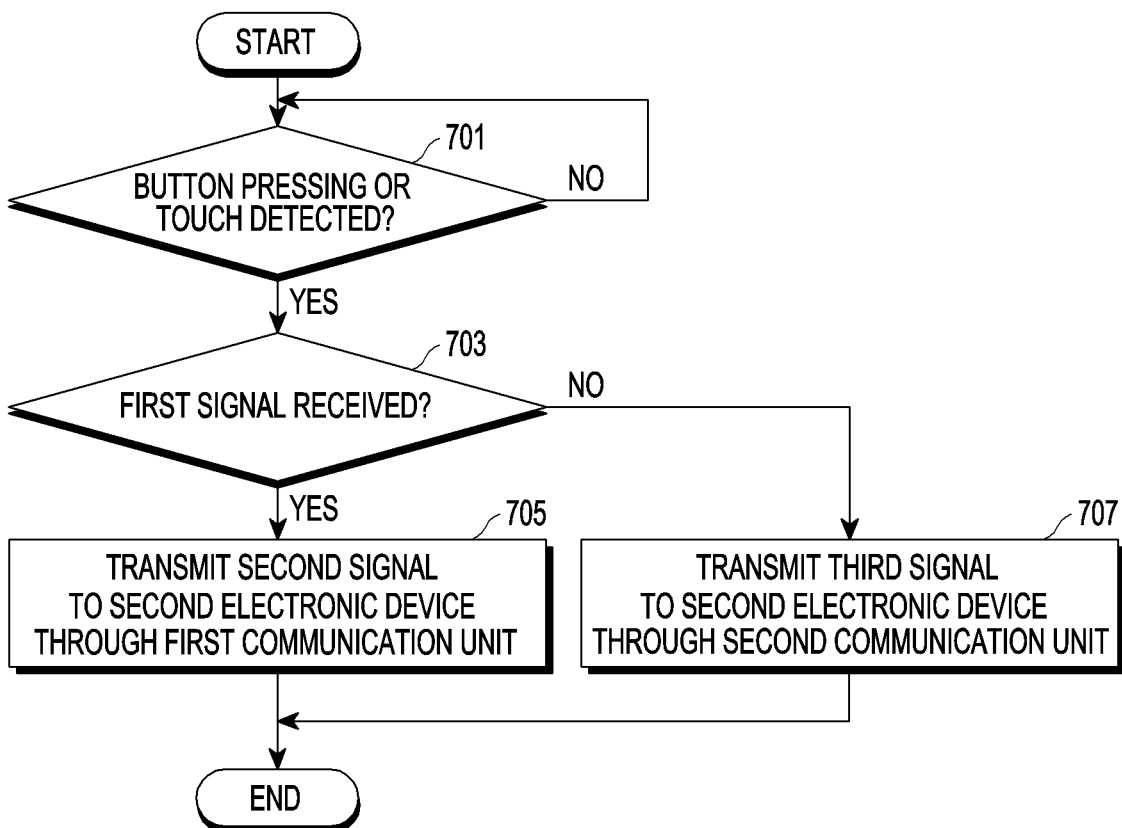
FIG. 7 is a flowchart illustrating an example method of operating a first electronic device according to various embodiments.

FIG. 7 is a flowchart illustrating an example method for operating a first electronic device according to various embodiments. FIG. 8A is a diagram illustrating an example operation between a first electronic device and a second electronic device according to various embodiments. FIG. 8B is a diagram illustrating an example operation between a first electronic device and a second electronic device according to various embodiments.

Referring to FIG. 7, the first electronic device 201 according to various embodiments may confirm whether a button input signal has been generated by pressing and/or touching a button (for example, the button 411 of FIG. 4) in operation 701. When it is confirmed that a button input signal has been generated, the first electronic device 201 may perform operation 703 and, if no button input signal has been generated, the first electronic device 201 may perform operation 701 again.

In operation 703, the first electronic device 201 may confirm whether an approach signal (for example, a first signal) generated based on an electromagnetic field signal generated by a coil (for example, the coil 611 of FIG. 6) has been received. When it is confirmed that the approach signal has been received, the electronic device 201 may perform operation 705 and, if no approach signal has been received, the first electronic device 201 may perform operation 707.

In operation 705, when the approach signal has been received, the first electronic device 201 may confirm that, as illustrated in FIG. 8A, the same is positioned in-range on the touchscreen 801 (for example, the touchscreen 301 of FIG. 3) of the second electronic device 101. Accordingly, the first electronic device 201 may transmit a second signal (for example, an EMR signal) to the second electronic device 101 through a first communication unit (for example, the first communication unit 513 of FIG. 5 or the first circuit 610 of FIG. 6) that uses an EMR input type.

In operation 707, when the approach signal is not received, the first electronic device 201 may confirm that, as illustrated in FIG. 8B, the same is out-of-range on the touchscreen 801 of the second electronic device 101. Accordingly, the first electronic device 201 may transmit a third signal (for example, a BLE signal) to the second electronic device 101 through a second communication unit (for example, the second communication unit 515 of FIG. 5 or the second circuit 620 of FIG. 6) that uses a BLE input type.

The above-described operation method illustrated in FIG. 7 will be described in greater detail with reference to the circuit configuration of the first electronic device 201.

Figure 9A:
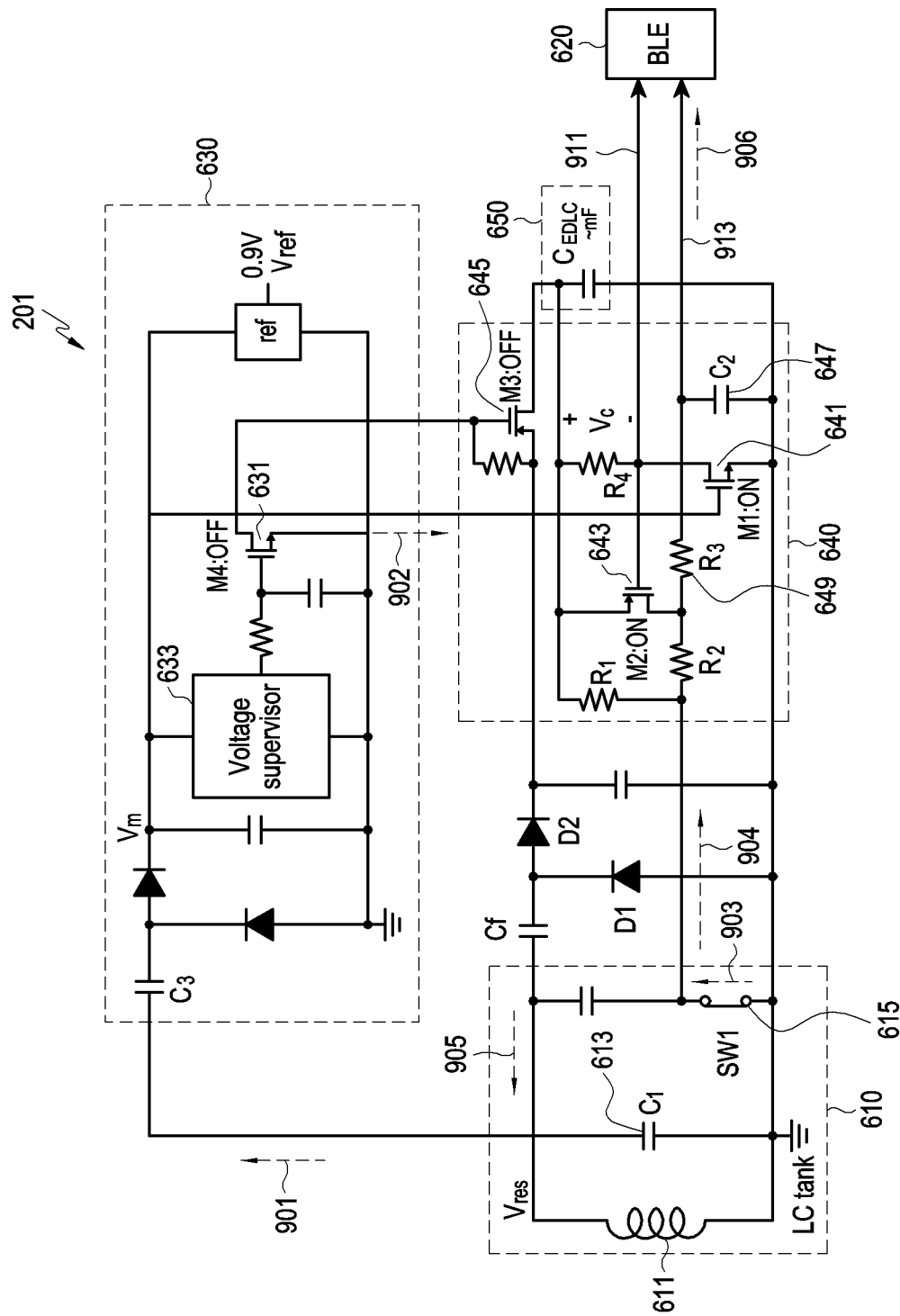
FIG. 9A is a diagram illustrating an example circuit configuration illustrating an example method of operating a first electronic device according to various embodiments.
Figure 9B:
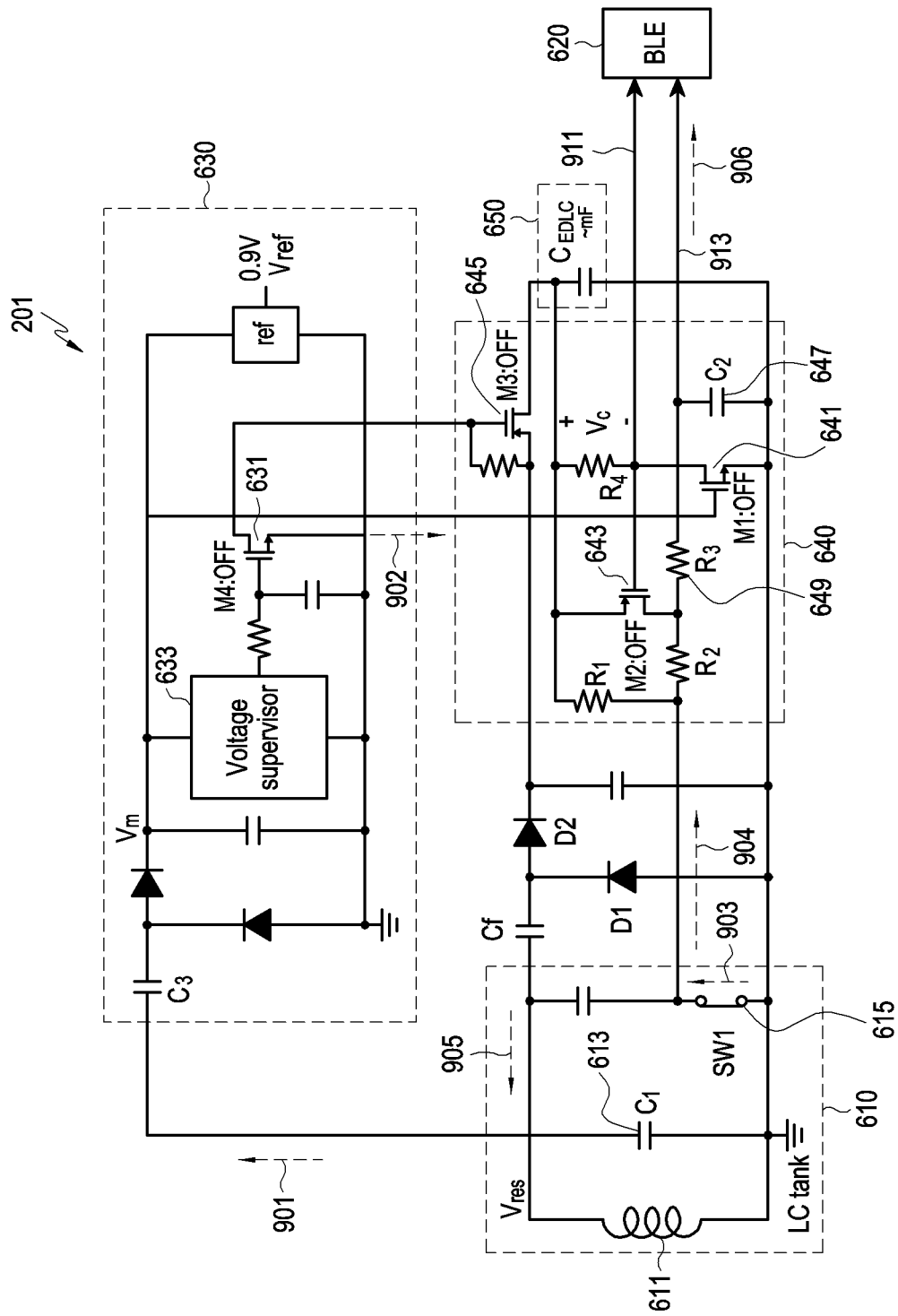
FIG. 9B is a diagram illustrating an example circuit configuration illustrating an example method of operating a first electronic device according to various embodiments.

FIG. 9A is a diagram illustrating an example circuit configuration illustrating an example method of operating a first electronic device according to various embodiments. FIG. 9B is a diagram illustrating an example circuitry configuration illustrating an example method of operating a first electronic device according to various embodiments.

Referring to FIG. 9A, if the first electronic device 201 according to various embodiments is positioned in-range on the touchscreen (for example, the touchscreen 301 of FIG. 3 or the touchscreen 801 of FIG. 8A and FIG. 8B) of the second electronic device 101, the same may receive an electromagnetic field signal generated by the second electronic device 101 in the first circuit 610. The first electronic device 201 may generate an electromagnetic field signal by means of an induction current in the first circuit 610 which is generated by the received electromagnetic field signal. Accordingly, a voltage Vm (for example, 0.5V or higher) may be applied to the first path 901 of the third circuit 630 connected to the first circuit 610, and the third circuit 630 may receive an approach signal applied to the first path 901 and may transfer the received approach signal to the control circuit 640 through the second path 902. The approach signal may indicate a first signal corresponding to the first electromagnetic field signal. Accordingly, the first switch M1 641 and the second switch M2 643 of the control circuit 640 may be turned on by the transferred approach signal. When the button switch SW1 is turned off, the first circuit 610 and the control circuit 640 are in short-circuited states, and no voltage is applied to the third path 903. In this case, the button input signal (SW1 signal) may not be transferred to the control circuit 640 through the fourth path 904. According to various embodiments, the capacitance C2 647 and the resistor R3 649 included in the control circuit 640 may perform operations of low-pass filters so as to prevent erroneous operations of the second circuit 620 due to the operating voltage of the first electronic device 201, which is transferred from Vres when the first switch SW1 615 is turned off. The second circuit 620 may operate when the input is zero as a result of an active-low operation. That is, when the input value of the second control signal 913 is zero, the second circuit 620 may recognize that the button (for example, the button 411 of FIG. 4) of the first electronic device 201 is pressed.

Although it has been assumed in the above description of various embodiments with reference to FIG. 9A that the second circuit 620 is activated when receiving a low signal according to an active-low operation, the second circuit 620 may be activated when receiving a high signal according to an active-high operation in another embodiment.

According to various embodiments, when the first electronic device 201 is positioned in-range on the touchscreen 301 of the second electronic device 101, and when the same senses pressing or touching of the button arranged on the surface of the housing, the button switch SW1 615 of the first circuit 610 may be turned on, and the first circuit 610 may transfer a button input signal B to the control circuit 640 through the third path 903. In this case, the resonance circuit of the first circuit 610 may generate an electromagnetic field signal (for example, a second electromagnetic field signal), the frequency of which is changed. According to various embodiments, if the control circuit 640 receives a button input signal B through the third path 903, and if the same receives an approach signal A from the third circuit 630, the same may transfer a first control signal 911 corresponding to the approach signal A and a second control signal 913 corresponding to the button input signal B to the second circuit 620 through the sixth path 906 such that the second circuit 620 does not transmit a third signal.

According to various embodiments, the control circuit 640 may transfer operation result values, which are obtained by operations based on the approach signal and the button input signal, to the second circuit 620 such that the second circuit 620 does not transmit a third signal. The operation result values may include an EMR button value and/or a BLE button value for determining the button input type. Since the second circuit 620 operates according to active-low, the second circuit 620 may transmit a third signal to the second electronic device when the BLE button value (operation result value) is zero.

Although it has been assumed in the above description of various embodiments with reference to FIG. 9A that the second circuit 620 is activated when the input is zero according to an active-low operation, the second circuit 620 may be activated when the input is one according to an active-high operation in another embodiment.

According to various embodiments, when the first electronic device 201 is positioned in-range on the touchscreen 301 of the second electronic device 101, and when pressing or touching of the button arranged on the surface of the housing is not sensed, the control circuit 640 may recognize that the value of the approach signal A is 1 as a result of receiving the approach signal A, as in Table 1 below, and may recognize that the value of the button input signal B is 1 as the button switch SW1 615 is turned off. After recognizing the value of the approach signal A as 1 and recognizing the value of the button input signal B as 1, the control circuit 640 may determine, through operations, that the value of the EMR button EMR BUTTON is 0, and the value of the inverted BLE button BLE BUTTON is 0. Accordingly, the second circuit 620 may recognize that the value of the EMR button EMR BUTTON is 0, and the value of the BLE button is 1, as illustrated in FIG. 9A.

When the first electronic device 201 is positioned in-range on the touchscreen 301 of the second electronic device 101, and when pressing or touching of the button arranged on the surface of the housing is sensed, the control circuit 640 may recognize that the value of the approach signal A is 1 as a result of receiving the approach signal A and, as in Table 1 below, and may recognize that the value of the button input signal B is 0 as the button switch SW1 615 is turned on. After recognizing the value of the approach signal A as 1 and recognizing the value of the button input signal B as 0, the control circuit 640 may determine, through operations, that the value of the EMR button EMR BUTTON is 1, and the value of the inverted BLE button BLE BUTTON is 0.

TABLE 1

| Stylus state | M1 | M2 | M3 | M4 | SW1 | B | Approach signal (A) | EMR BUTTON | /BLE BUTTON |
|---|---|---|---|---|---|---|---|---|---|
| In-range | On | On | Off | Off | 0 (Off) | 1 | 1 | 0 | 0 |
| (on display) | On | On | Off | Off | 1 (On) | 0 | 1 | 1 | 0 |

As given in Table 1 above, when the approach signal A is 1, and when the EMR button EMR BUTTON value is 0, the first circuit 610 may not transmit a second signal (for example, an EMR signal) corresponding to a second electromagnetic field signal, the frequency of which is changed, and the second circuit 620 may not transmit a third signal (for example, a BLE signal).

In addition, as given in Table 1 above, when the approach signal A is 1, and when the EMR button EMR BUTTON value is 1, the first circuit 620 may transmit the second signal, and the second circuit 620 may not transmit the third signal (for example, a BLE signal) after recognizing that the BLE button value is 1 on the basis of the value of the inverted BLE/BLE BUTTON.

Referring to FIG. 9B, when a voltage is applied to the first circuit 610 of the first electronic device 201 according to various embodiments, a first electromagnetic field may be generated by the resonance circuit including a coil L 611 and a capacitance C1 613. When the first electronic device 201 is positioned out-of-range on the touchscreen 301 of the second electronic device 101, the first circuit 610 may not receive an electromagnetic field signal from the second electronic device 101. Accordingly, the third circuit 630 connected to the first circuit 610 may not receive an approach signal A corresponding to the electromagnetic field signal, and the approach signal A may not be transferred through the fifth path 905. When the button switch SW1 615 is turned off, the first circuit 610 and the control circuit 640 are in short-circuited states, and no voltage is applied to the third path 903. In this case, the button input signal B may not be transferred to the control circuit 640. According to various embodiments, the capacitance C2 647 and the resistor R3 679 included in the control circuit 640 may perform operations of low-pass filters so as to prevent erroneous operations of the second circuit 620 due to the operating voltage of the first electronic device 201, which is transferred from Vres when the first switch SW1 615 is turned off. The second circuit 620 may operate when the input is 0 as a result of an active-low operation. That is, when the input value of the second control signal 913 is 0, the second circuit 620 may recognize that the button (for example, the button 411 of FIG. 4) of the first electronic device 201 is pressed.

Although it has been assumed in the above description of various embodiments with reference to FIG. 9B that the second circuit 620 is activated when the input is 0 according to an active-low operation, the second circuit 620 may be activated when the input is 1 according to an active-high operation in another embodiment.

According to various embodiments, when positioned out-of-range on the touchscreen of the second electronic device 101, and when pressing or touching of the button arranged on the surface of the housing is sensed, the button switch SW1 615 of the first circuit 610 is turned on, and a voltage is applied to the third path 903. As a result, a button input signal B may be transferred to the control circuit 640 through the third path 903.

According to various embodiments, when the first electronic device 201 is positioned out-of-range on the touchscreen 301 of the second electronic device 101, the fourth switch M4 631 and the third switch M3 645 may be turned off, as in Table 2 below, and the first switch M1 641 and the second switch M2 643 of the control circuit 640 may be turned off because the approach signal A is not received by the control circuit 640.

According to various embodiments, when the first electronic device 201 is positioned out-of-range on the touchscreen 301 of the second electronic device 101, and when pressing or touching of the button is not sensed, the control circuit 640 may recognize that the value of the approach signal A is 0 because no approach signal A is received, as in Table 2 below, and may recognize that the value of the button input signal B is 1 as the button switch SW1 is turned off. After recognizing the value of the button input signal B as 1, the control circuit 640 may recognize that the value of the inverted BLE button BLE BUTTON is 0, and the value of the EMR button EMR BUTTON is 0.

According to various embodiments, when the first electronic device 201 is positioned out-of-range on the touchscreen 301 of the second electronic device 101, and when pressing or touching of the button is sensed, the control circuit 640 may recognize that the value of the approach signal A is 0 because no approach signal A is received, as in Table 2 below, and may recognize that the value of the button input signal B is 0 as the button switch SW1 is turned on. A first control signal 911, which indicates that the value of the approach signal A is 0, and a second control signal 913, which indicates that the value of the button input signal B is 0, may be transferred to the second circuit 620 through the sixth path 906 such that the second circuit 620 transmits a third signal. According to various embodiments, after recognizing the value of the button input signal B as 0, the control circuit 640 may recognize, through operation results, that the value of the inverted BLE button/BLE BUTTON is 1, and the value of the EMR button EMR BUTTON is 0.

TABLE 2

| Stylus state | M1 | M2 | M3 | M4 | SW1 | B | Approach signal (A) | EMR BUTTON | /BLE BUTTON |
|---|---|---|---|---|---|---|---|---|---|
| Out-of-range | Off | Off | Off | Off | 0 (Off) | 1 | 0 | 0 | 0 |
| (on display) | Off | Off | Off | Off | 1 (On) | 0 | 0 | 0 | 1 |

As given in Table 2 above, when the approach signal value is 0, when the value of the inverted BLE button BLE BUTTON value is 0, and when the value of the button input signal B is 1, the second circuit 620 may not transmit a third signal (for example, a BLE signal) as a result of recognizing that value of the BLE button is 1 on the basis of the value of the inverted BLE button. In addition, when the approach signal value is 0, when the value of the inverted BLE button/BLE BUTTON value is 1 and when the value of the button input signal B is 0, the second circuit 620 may transmit a third signal (for example, a BLE signal) to the second electronic device 101 as a result of recognizing that the value of the BLE button is 0 on the basis of the value of the inverted BLE button.

Figure 10:
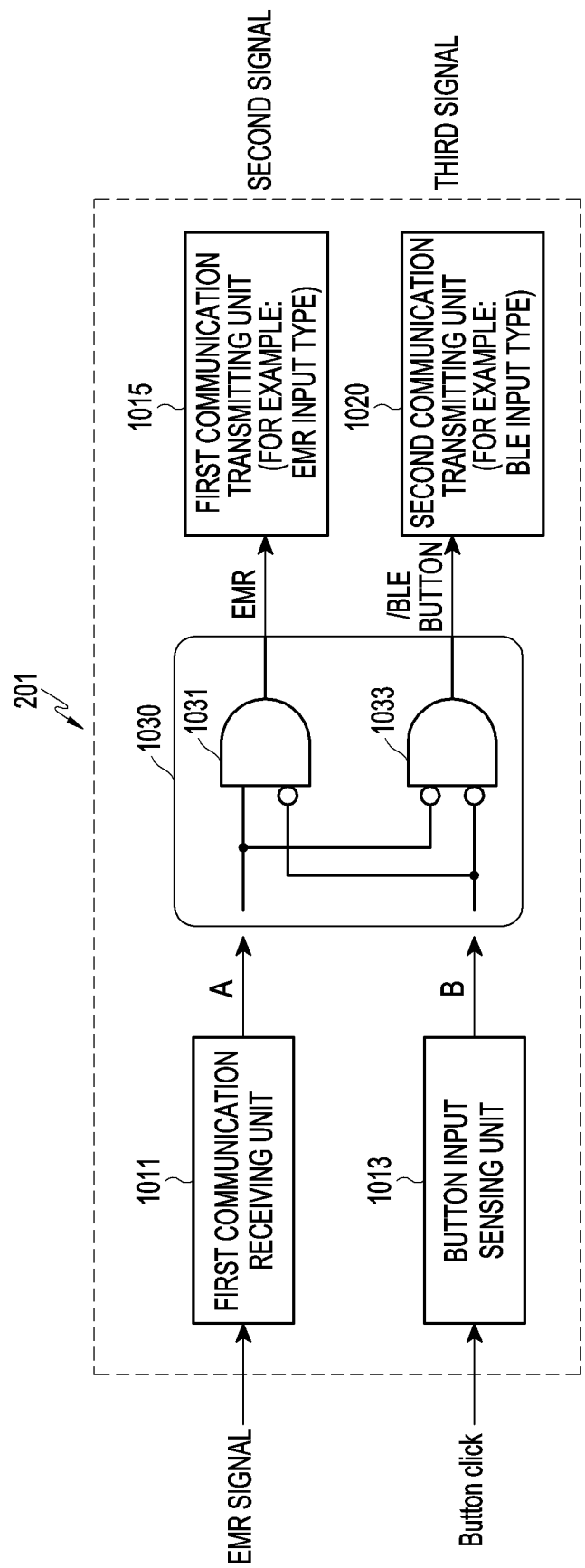
FIG. 10 is a diagram illustrating an example method of operating a first electronic device according to various embodiments.

FIG. 10 is a diagram illustrating an example method for operating a first electronic device according to various embodiments.

Referring to FIG. 10, the first electronic device 201 according to various embodiments may perform a hybrid logic operation through a control circuit 1030 (for example, the same as or similar to a part of the processor 511 of FIG. 5, the control circuit 640 of FIG. 6, or the second circuit 620 of FIG. 6). The control circuit 1030 may receive an approach signal A corresponding to a first electromagnetic field signal (EMR signal) from the first communication receiving unit 1011 (for example, the same as to or similar to the first communication unit 513 of FIG. 5 or the third circuit 630 of FIG. 6), and may receive a button input signal B that is sensed, according to whether the button switch SW1 is turned on or off, by the button input sensing unit 1013.

Referring to FIG. 10, according to various embodiments, the control circuit 1030 may include a first AND gate 1031 and a second AND gate 1033. When an approach signal A is received, and when the button switch SW1 615 is turned on, that is, when the value of the approach signal A is 1, and when the value of the button input signal B is 0, as in Table 1 above, the control circuit 1030 may perform an operation as in Equation 1 below by the first AND gate 1031, thereby calculating the value of the EMR button EMR BUTTON, and may perform an operation as in Equation 2 below by the second AND gate 1033, thereby calculating the value of the inverted BLE button BLE BUTTON. The first control circuit 1030 may acquire 1 as the value of the EMR button EMR BUTTON by the first AND gate 1031, and may acquire 0 as the value of the inverted BLE button BLE BUTTON by the second AND gate 1033. Accordingly, the control circuit 1030 may recognize a button input as an EMR button input, and may transmit a second signal corresponding to a second electromagnetic field signal, the frequency of which is changed, to the second electronic device 101 through the first communication transmitting unit 1015 (for example, identical or similar to the first communication unit 513 of FIG. 5).

$$\text{EMR BUTTON}=A \text{ and } (\text{not}B)=A \cdot B' \qquad \text{Equation 1}$$

$$/\text{BLE BUTTON}=(\text{not}A) \text{ and } (\text{not}B) \; A' \cdot B' \qquad \text{Equation 2}$$

Referring to FIG. 10, according to various embodiments, when an approach signal A is received, and when the button switch SW1 615 is turned off, that is, when the value of the approach signal A is 1, and when the value of the button input signal (SW1 signal) is 1 as in Table 1 above, the control circuit 1030 may perform an operation as in Equation 1 above by the first AND gate 1031, thereby calculating the value of the EMR button EMR BUTTON, and may perform an operation as in Equation 2 above by the second AND gate 1033, thereby calculating the value of the inverted BLE button BLE BUTTON. The first control circuit 1030 may acquire 0 as the value of the EMR button EMR BUTTON by the first AND gate 1031, and may acquire 0 as the value of the inverted BLE button BLE BUTTON by the second AND gate 1033.

Referring to FIG. 10, according to various embodiments, when no approach signal A is received, and when the button switch SW1 is turned on, that is, when the value of the approach signal A is 0, and when the value of the button input signal B is 0 as in Table 2 above, the control circuit 1030 may perform an operation as in Equation 2 above by the second AND gate 1033, thereby calculating the value of the inverted BLE button/BLE BUTTON. The control circuit 1030 may recognize 0 as the value of the EMR button calculated by the first AND gate 1031, and may recognize 1 as the value of the inverted BLE button/BLE BUTTON calculated by the second AND gate 1033. Accordingly, the control circuit 1030 may recognize a button input as a BLE button input, and may transmit a third signal (for example, a BLE signal) through the second communication transmitting unit 1020 (for example, identical or similar to the second communication unit 515 of FIG. 5 or the second circuit 620 of FIG. 6).

Although it has been assumed in the above description of various embodiments with reference to FIG. 10 that the control circuit 1030 of the electronic device 201 acquires the EMR button value and the inverted BLE button value on the basis of the active-low operation, the control circuit 1030 of the first electronic device 201 illustrated in FIG. 10 may acquire the EMR button value and the inverted BLE button value on the basis of an active-high operation according to various other embodiments, and the second communication transmitting unit 1020 operating active-high may transmit a third signal when the BLE button value is 1.

A method for an operation in an electronic device including a button for a user information input according to an example of various embodiments may include the operations of: receiving a first electromagnetic signal from a touchscreen display of an external device and transmitting a second electromagnetic signal to the display of the external device; checking pressing and/or touching of the button; transmitting the second electromagnetic signal to the display of the external device, while preventing a third signal from being transmitted through a first communication unit, in response to pressing and/or touching of the button while the first signal is received; and transmitting the third signal to the external device through a second communication unit in response to pressing and/or touching of the button without receiving the first signal.

According to various embodiments, the third signal may have a frequency between 900 MHz and 5 GHz.

According to various embodiments, the operation of transmitting the second signal may include an operation of providing a current resulting from pressing and/or touching of the button, while the first signal is received, and not transmitting the third signal through the second communication unit.

According to various embodiments, the second signal may be the second electromagnetic signal having a changed frequency, and may be a signal related to a first operation of an application executed by the external device.

According to various embodiments, the third signal may be a Bluetooth low energy (BLE) signal and may be a signal related to a second operation of the application executed by the external device.

According to various embodiments, the method may further include the operations of: determining an input type of the button based on a first control signal indicating reception of the first signal and a second control signal indicating pressing and/or touching of the button; and performing low-pass filtering to avoid an erroneous operation of the second circuit when pressing and/or touching of the button does not occur.

According to various embodiments, the operation of transmitting the second signal to the external device may include an operation of not providing a current resulting from pressing or touching of the button while the first signal is received.

Figure 11:
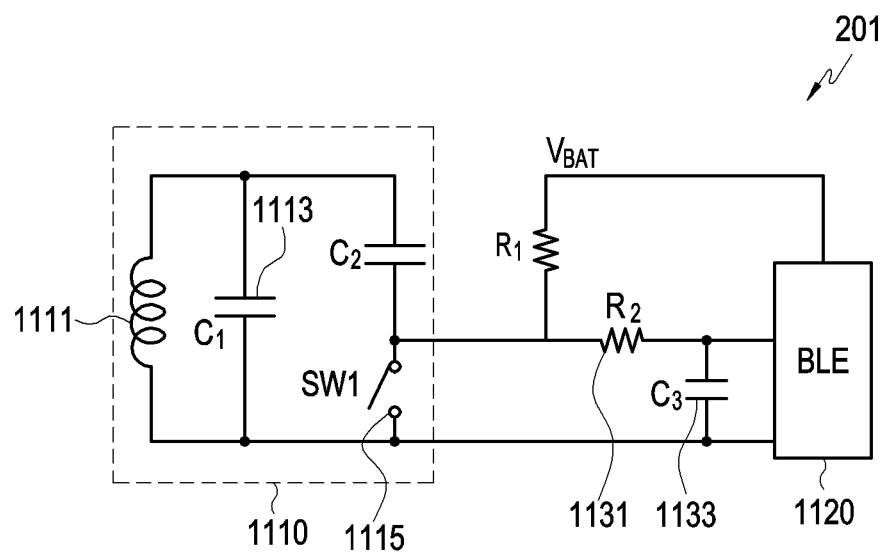
FIG. 11 is a diagram illustrating an example circuit configuration of a first electronic device according to various embodiments.

FIG. 11 is a diagram illustrating example circuit configuration of a first electronic device according to various embodiments.

Referring to FIG. 11, the first electronic device 201 according to various embodiments may include a first circuit 1110 and a second circuit 1120. Resistors R1 and R2 1131 and a capacitance C3 1133 may be electrically connected between the first circuit 1110 and the second circuit 1120.

The first circuit 1110 is an EMR input-type circuit, for example, and may include a resonance circuit including a coil 1111 capable of generating an electromagnetic field and a capacitance C1 1113. In addition, the first circuit 1110 may include at least one element (for example, a resistor, a capacitance, and/or an inductance) that makes it possible to change the intensity or frequency of the electromagnetic field according to the user's manipulation state. The first circuit 1110 may also include a button switch SW1 1115 that is switched in response to the user's pressing or touching of the button (for example, the button 411 of FIG. 4) arranged on the surface of the housing.

When the button switch 1115 is turned on, the frequency of the first electromagnetic field signal generated by the coil 1111 may be changed, and the first circuit 1110 may transmit an electromagnetic field signal (a second electromagnetic field signal), the frequency of which is changed, to the second electronic device 101. When the button switch SW1 1115 is turned on, the first circuit 1110 may be connected to the second circuit 1120 and may transfer a button input signal to the second circuit 1120.

The second circuit 1120 may include a module including circuitry for near-field communication, that is, a second communication type (for example, BLE) and may be connected to the first control circuit 1110. The second circuit 1120 may receive the button input signal. When the button input signal is received, the second circuit 1120 may transmit a third signal (for example, a BLE signal) to the second electronic device 101 in the second communication type.

The resistor R2 1131 and the capacitance C3 1133 may perform low-pass filter operations to avoid erroneous operations of the second circuit when the button switch SW1 1115, which is switched by pressing or touching the button, is turned off.

Figure 12:
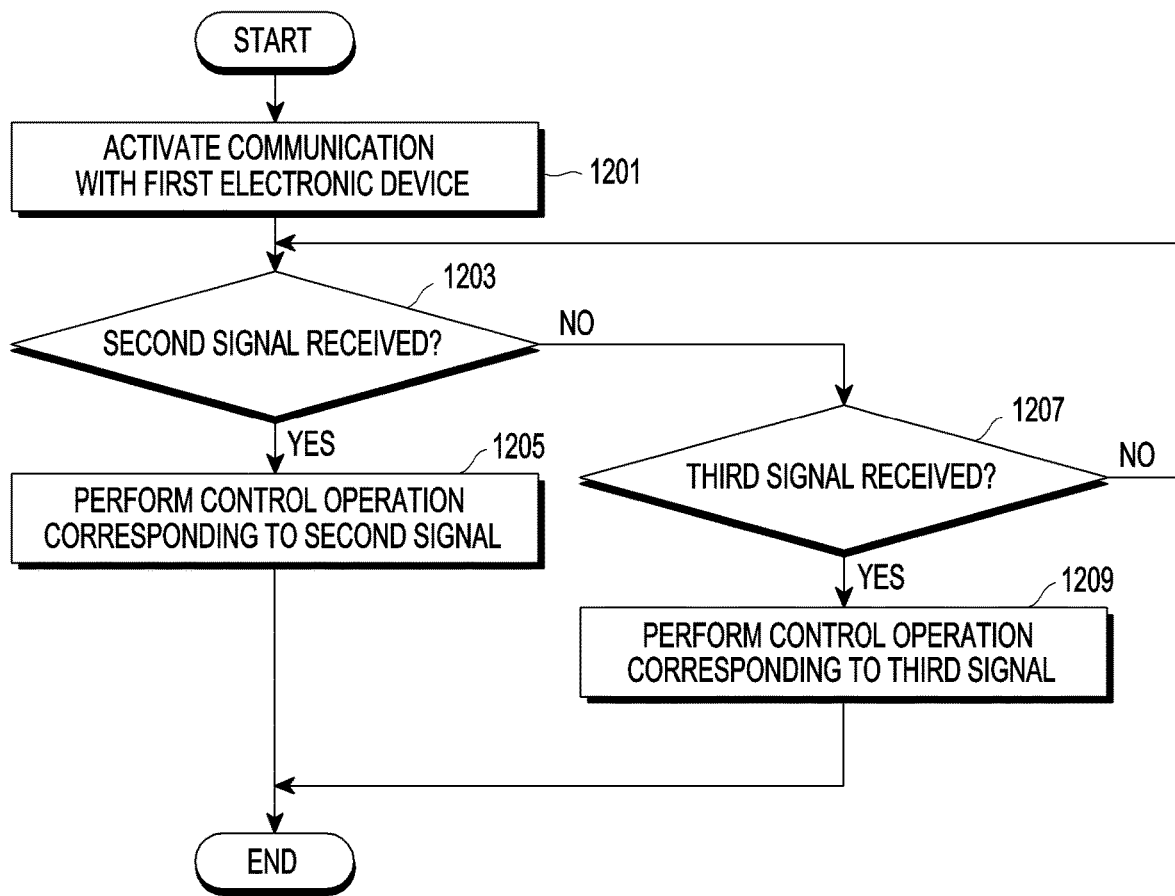
FIG. 12 is a flowchart illustrating an example method of operating a second electronic device according to various embodiments.

FIG. 12 is a flowchart illustrating an example method of operating a second electronic device according to various embodiments.

Referring to FIG. 11 and FIG. 12, the second electronic device 101 may activate communication with the first electronic device 201 in operation 1201. When an electromagnetic field signal is received from the first electronic device 201, an induction current may be generated in an electromagnetic field circuit (not illustrated) arranged on the touchscreen, and the second electronic device 101 may transmit the electromagnetic field signal to the first electronic device 201.

In operation 1203, the second electronic device 101 may confirm whether a second signal corresponding to an electromagnetic field signal (for example, a second electromagnetic field signal), the frequency of which is changed in response to a button input from the first electronic device 201, is received from the first circuit 1110, or whether the second signal is received together with a third signal. When it is confirmed that the second signal is received, the second electronic device 101 may perform operation 1205 and, when the second signal is not received, may perform operation 1207.

In operation 1205, the second electronic device 101 may recognize that the first electronic device 201 is positioned in-range and may perform a control operation corresponding to the second signal. When the third signal is received together with the second signal, the second electronic device 101 may give priority to the second signal and may perform a control operation corresponding to the second signal. According to various embodiments, when the second signal and the third signal are received together, the second electronic device 101 may use a logical operation circuit as in FIG. 10 such that, according to the operation result value, the button input of the first electronic device 201 is recognized as an EMR button input, and may perform a control operation corresponding to the second signal.

In operation 1207, the second electronic device 101 may confirm whether a third signal (for example, a BLE signal) generated in response to a button input has been received from the second circuit 1120 of the first electronic device 201. When it is confirmed that the third signal has been received, operation 1209 may be performed and, when the third signal has not been received, operation 1203 may be performed again.

In operation 1209, when the second signal is not received, and when the third signal is received, the second electronic device 101 may recognize that the first electronic device 201 is positioned out-of-range, and may perform a control operation corresponding to the third signal. According to various embodiments, the second electronic device 101 may use a logical operation circuit as in FIG. 10 such that, according to the operation result value, the button input of the first electronic device 201 is recognized as a BLE button input and may perform a control operation corresponding to the third signal.

Figure 13A:
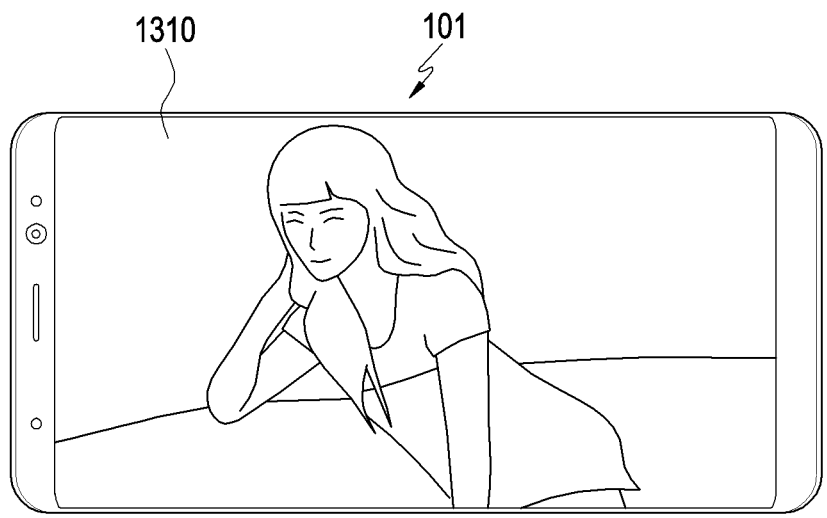
FIG. 13A is a diagram illustrating an example operation of a second electronic device according to various embodiments.
Figure 13B:
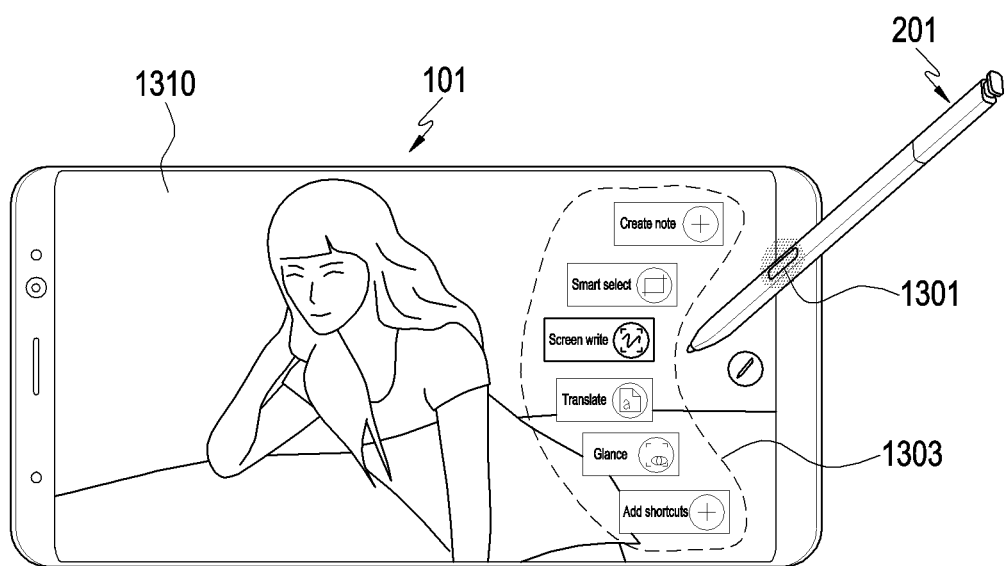
FIG. 13B is a diagram illustrating an example operation of a second electronic device according to various embodiments.

FIG. 13A is a diagram illustrating an example operation of a second electronic device 101 according to various embodiments. FIG. 13B is a diagram illustrating an example operation of a second electronic device 101 according to various embodiments.

Referring to FIG. 13A and FIG. 13B, when the second electronic device 101 according to various embodiments receives a second signal corresponding to an electromagnetic field signal, the frequency of which is changed in response to a button input 1301, from the first electronic device 201, the second electronic device 101 may perform in-range communication with the first electronic device 201 and may control an executed application (for example, camera preview 1310) according to the second signal as illustrated in FIG. 13A. According to various embodiments, the second electronic device 101 may perform a first control operation 1303 for activating and displaying an air command menu in the position in which the second signal is received from the timepoint at which the second signal is received, as in FIG. 13B. The second electronic device 101 may select a first function (for example, "Create note") from the activated air command menu and may perform a control operation related to the input of the first function on the screen of the camera preview 1310.

Figure 14A:
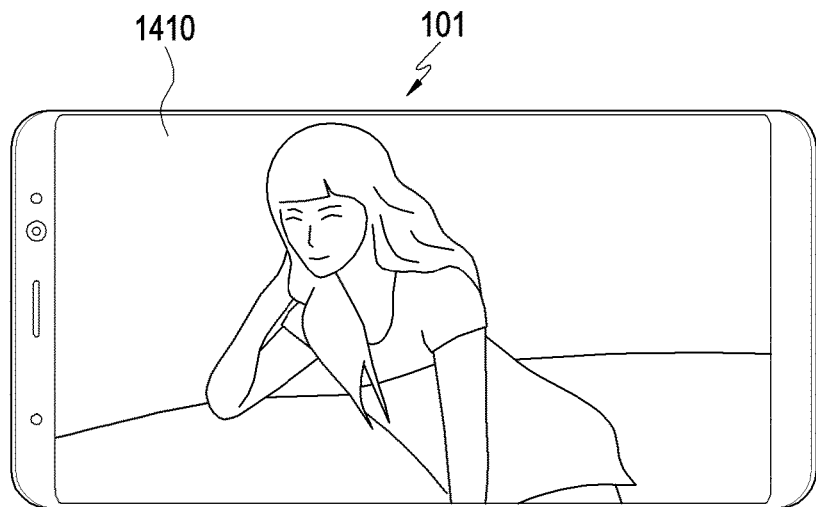
FIG. 14A is a diagram illustrating another example operation of a second electronic device according to various embodiments.
Figure 14B:
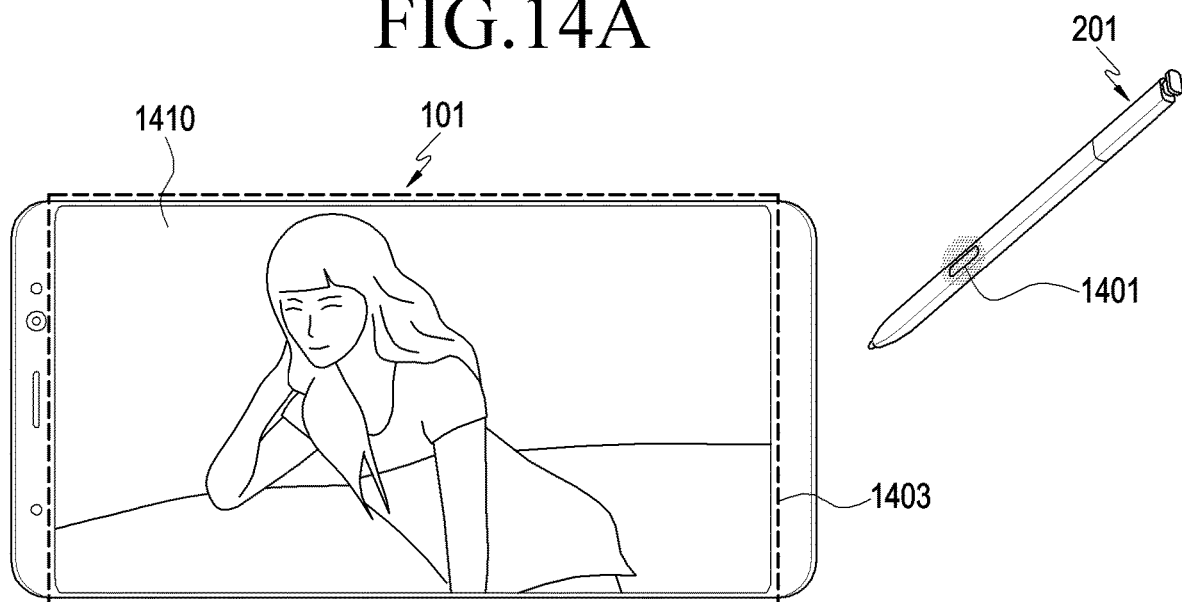
FIG. 14B is a diagram illustrating another example operation of a second electronic device according to various embodiments.

FIG. 14A is a diagram illustrating another example operation of a second electronic device according to various embodiments. FIG. 14B is a diagram illustrating another example operation of a second electronic device according to various embodiments.

When the second electronic device 101 according to various embodiments receives a third signal corresponding to a BLE button input 1401 from the first electronic device 201, the second electronic device 101 may control an executed application (for example, camera preview 1410) according to the third signal as illustrated in FIG. 14A. According to various embodiments, when the second electronic device 101 receives a third signal as in FIG. 14B, the second electronic device 101 may perform, as a control operation corresponding to the third signal, a second control operation 1403 for imaging (selfie) at least a partial area of an image of the camera preview 1410 displayed at the timepoint at which the third signal is received and may reduce the degree of hand vibration resulting from the user's operation of pressing the imaging button.

Each of elements described in various embodiments may be configured by at least one component, and the name of the corresponding element may vary depending on the type of the electronic device. The electronic device according to various embodiments of the disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

The term "module" as used herein may, for example, refer to a unit including one of hardware, software, and firmware or any combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include, for example, and without limitation, at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the disclosure may be implemented by a command stored in a computer-readable storage medium in a programming module form. When the instruction is executed by one or more processors (e.g., the processor 120 in FIG. 1), the one or more processors may perform a function corresponding to the command. The computer-readable storage medium may be, for example, the memory 130 in FIG. 1.

The computer readable recoding medium may include, for example, and without limitation, a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer using code executable by an interpreter, as well as machine codes made by a compiler. The aforementioned hardware device may be configured to operate as one or more software modules in order to perform the operation of the disclosure, and vice versa.

The programming module according to the disclosure may include one or more of the aforementioned components or may further include other additional components, or some of the aforementioned components may be omitted. Operations executed by a module, a programming module, or other component elements according to various embodiments of the disclosure may be executed sequentially, in parallel, repeatedly, or in a heuristic manner. Furthermore, some operations may be executed in a different order or may be omitted, or other operations may be added.

According to various embodiments, in connection with a non-transitory computer-readable recording medium storing a program to be performed by a computer including a button for a user information input, the program may include executable commands that, when executed by a processor, cause the processor to perform operations including: receiving a first electromagnetic signal from a touchscreen display of an external device; detecting pressing and/or touching of the button; transmitting a second electromagnetic signal to the display of the external device through a first communication unit, while preventing a third signal from being transmitted, in response to pressing and/or touching of the button while the first signal is received; and transmitting the third signal to the external device through a second communication unit, without receiving the first signal, in response to pressing and/or touching of the button.

Various embodiments disclosed herein are provided for illustration, not limitation. Accordingly, the scope of the disclosure should be understood as including all modifications or various other embodiments based on the technical idea of the disclosure.

What is claimed is:

1. An electronic pen device comprising:
a housing including a first end and a second end;
a pen tip disposed at the first end of the housing;
a user input device disposed on the housing;
communication circuitry configured for Bluetooth communication; and
a processor configured to:
control the communication circuitry to establish a Bluetooth communication connection with an external electronic device,
while the Bluetooth communication connection is established with the external electronic device, cause a pen signal to be output for a drawing input to the external electronic device, when the pen tip is in contact with a display surface of the external electronic device, and
while the Bluetooth communication connection is established with the external electronic device, detect an input to the user input device; and
in response to detecting the input,
control to transmit a signal corresponding to the input using the Bluetooth communication connection based on whether the pen tip is within a specified distance range of the external electronic device, wherein the control to transmit the signal comprises control to not transmit the signal using the Bluetooth communication connection based on the pen tip being within the specified distance range.

2. The electronic pen device of claim 1, wherein the control to transmit the signal further comprises control to transmit the signal using the Bluetooth connection based on the pen tip being outside the specified distance range.

3. The electronic pen device of claim 2, wherein the processor is further configured to:
identify whether the pen tip is within the specified distance range based on detecting a signal that is generated when the pen tip is in contact with or in proximity to the external electronic device.

4. The electronic pen device of claim 1, wherein the processor is further configured to:
identify whether the pen tip is within the specified distance range based on detecting a signal that is generated when the pen tip is in contact with or in proximity to the external electronic device.

5. The electronic pen device of claim 4, wherein the signal, generated when the pen tip is in contact with or in proximity to the external electronic device, is caused by a signal external to the electronic pen device.

6. The electronic pen device of claim 1, wherein the signal includes a control signal for controlling an application executed by the external electronic device.

7. A method of operation in an electronic pen device comprising:
controlling communication circuitry of the electronic pen device to establish a Bluetooth communication connection with an external electronic device;
while the Bluetooth communication connection is established with the external electronic device, causing a pen signal to be output for a drawing input to the external electronic device, when a pen tip of the electronic pen device is in contact with a display surface of the external electronic device;
while the Bluetooth communication connection is established with the external electronic device,
detecting an input to a user input device of the electronic pen device; and
in response to detecting the input,
controlling to transmit a signal corresponding to the input using the Bluetooth communication connection based on whether the pen tip is within a specified distance range of the external electronic device, wherein the controlling to transmit the signal comprises controlling to not transmit the signal using the Bluetooth communication connection based on the pen tip being within the specified distance range.

8. The method of claim 7, wherein the controlling to transmit the signal further comprises controlling to transmit the signal using the Bluetooth communication connection based on the pen tip being outside the specified distance range.

9. The method of claim 8, further comprising:
identifying whether the pen tip is within the specified distance range based on detecting a signal that is generated when the pen tip is in contact with or in proximity to the external electronic device.

10. The method of claim 7, further comprising:
identifying whether the pen tip is within the specified distance range based on detecting a signal that is generated when the pen tip is in contact with or in proximity to the external electronic device.

11. The method of claim 10, wherein the signal, generated when the pen tip is in contact with or in proximity to the external electronic device, is caused by a signal external to the electronic pen device.

12. The method of claim 7, wherein the signal includes a control signal for controlling an application executed by the external electronic device.

13. A system comprising:
an electronic pen device including:
a housing including a first end and a second end;
a pen tip disposed at the first end of the housing;
a user input device disposed on the housing;
first communication circuitry configured for Bluetooth communication; and
a processor;
an electronic device including:
a touch screen;
at least one processor; and
second communication circuitry configured for Bluetooth communication,
wherein the processor of the electronic pen device is configured to:
control the first communication circuitry to establish a Bluetooth communication connection with the electronic device,
while the Bluetooth communication connection is established with the electronic device, cause a pen signal to be output for a drawing input to the electronic device, when the pen tip is in contact with the touch screen of the electronic device,
while the Bluetooth communication connection is established with the electronic device,
detect an input to the user input device, and
in response to detecting the input,
control to transmit a signal corresponding to the input using the Bluetooth communication connection based on whether the pen tip is within a specified distance range of the electronic device, wherein the control to transmit the signal comprises controlling to not transmit the signal using the Bluetooth communication connection based on the pen tip being within the specified distance range.

14. The system of claim 13, wherein the at least one processor of the electronic device is configured to:
control the second communication circuitry to establish the Bluetooth communication connection with the electronic pen device,
control the second communication circuitry to receive the signal corresponding to the input using the Bluetooth communication connection, and
execute an operation of an application based on the received signal.

15. An electronic pen device comprising:
a housing including a first end and a second end;
a pen tip disposed at the first end of the housing;
a user input device disposed on the housing;
communication circuitry configured for Bluetooth communication; and
a processor configured to:
control the communication circuitry to establish a Bluetooth communication connection with an external electronic device,
while the Bluetooth communication connection is established with the external electronic device, cause a pen signal to be output for a drawing input to the external electronic device, when the pen tip is in contact with a display surface of the external electronic device, and
while the Bluetooth communication connection is established with the external electronic device,
detect an input to the user input device;
in response to detecting the input, identify whether the pen tip is within a specified distance range of the external electronic device,
based on identifying the pen tip as not being within the specified distance range, control the communication circuitry to transmit a signal corresponding to the input using the Bluetooth communication connection, and
based on identifying the pen tip as being within the specified distance range, control the communication circuitry to not transmit the signal using the Bluetooth communication connection.

16. The electronic pen device of claim 15, wherein the processor is further configured to:
identify that the pen tip is within the specified distance range based on detecting a signal that is generated when the pen tip is in contact with or in proximity to the external electronic device.

17. The electronic pen device of claim 16, wherein the signal, generated when the pen tip is in contact with or in proximity to the external electronic device, is caused by a signal external to the electronic pen device.

18. The electronic pen device of claim 15, wherein the signal includes a control signal for controlling an application executed by the external electronic device.

* * * * *